(12) United States Patent
Yamato

(10) Patent No.: US 8,239,621 B2
(45) Date of Patent: Aug. 7, 2012

(54) DISTRIBUTED DATA STORAGE SYSTEM, DATA DISTRIBUTION METHOD, AND APPARATUS AND PROGRAM TO BE USED FOR THE SAME

(75) Inventor: Junichi Yamato, Tokyo (JP)

(73) Assignee: NEC Corporation, Tokyo (JP)

( * ) Notice: Subject to any disclaimer, the term of this patent is extended or adjusted under 35 U.S.C. 154(b) by 666 days.

(21) Appl. No.: 12/033,426

(22) Filed: Feb. 19, 2008

(65) Prior Publication Data

US 2008/0201336 A1   Aug. 21, 2008

(30) Foreign Application Priority Data

Feb. 20, 2007 (JP) ................................. 2007-040093

(51) Int. Cl.
*G06F 12/00* (2006.01)
(52) U.S. Cl. ............ 711/114; 711/170; 725/96; 725/115
(58) Field of Classification Search .......... 707/736–740; 711/114, 127, 153, 157, 170–173
See application file for complete search history.

(56) References Cited

U.S. PATENT DOCUMENTS

| 6,449,688 | B1 * | 9/2002 | Peters et al. ................... | 711/112 |
| 7,143,433 | B1 * | 11/2006 | Duan et al. ..................... | 725/115 |
| 2004/0049632 | A1 * | 3/2004 | Chang et al. .................. | 711/114 |
| 2004/0103260 | A1 * | 5/2004 | Nalawadi et al. ............. | 711/173 |

FOREIGN PATENT DOCUMENTS

| JP | 7-141232 A | 6/1995 |
| JP | 09171479 A | 6/1997 |
| JP | 09223049 A | 8/1997 |
| JP | 10254632 A | 9/1998 |
| JP | 11085604 A | 3/1999 |
| JP | 2001243099 A | 9/2001 |
| JP | 2002244893 A | 8/2002 |

OTHER PUBLICATIONS

Hennessy et al, "Computer Architecture: A Quantitative Approach", 3rd Edition, Morgan Kaufmann Pub. 2001, pp. 707.
Japanese Office Action for JP2007-040093 issued Mar. 6, 2012.
K. Fujita, "Recommendation of disk array approach", Nikkei Byte, Japan, Nikkei Business Publications, Inc., No. 190, Apr. 22, 1999, pp. 104-117.
IBM, ServerRAID, User's Reference the 4th edition, Japan, IBM Japan Ltd., Jan. 31, 2007, pp.24-26.

* cited by examiner

*Primary Examiner* — Brian Peugh
*Assistant Examiner* — Nicholas Simonetti

(57) ABSTRACT

There is provided a distributed data storage system for splitting content-data into a plurality of split data and storing a plurality of copy data corresponding to at least one of the plurality of split data in a plurality of memory devices. The system comprises a copying management information storing unit and a access location determining unit. The copying management information storing unit stores copying management information indicating a storage location of the copy data corresponding to the split data. The access location determining unit determines at least one of the plurality of memory devices storing the copy data corresponding to the split data as an access location for accessing split data.

36 Claims, 22 Drawing Sheets

FIG.3

| CHUNK REFERENCE INFORMATION 1 | CHUNK REFERENCE INFORMATION 2 | CHUNK REFERENCE INFORMATION 3 | ... | CHUNK REFERENCE INFORMATION n |
|---|---|---|---|---|

FIG.4

| MEMORY DEVICE ID 1 | MEMORY DEVICE ID 2 | MEMORY DEVICE ID 3 | ... | MEMORY DEVICE ID n |
|---|---|---|---|---|

FIG.5
CHUNK IN CONTENT-FILE
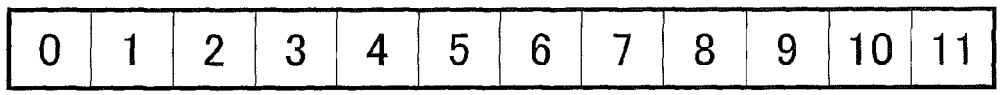
| CHUNK OF MEMORY DEVICE ID = 0 | CHUNK OF MEMORY DEVICE ID = 10 |
|---|---|
| 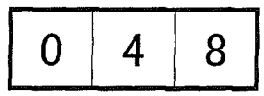 | 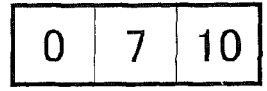 |
| CHUNK OF MEMORY DEVICE ID = 1 | CHUNK OF MEMORY DEVICE ID = 11 |
| 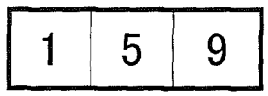 | 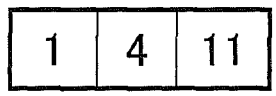 |
| CHUNK OF MEMORY DEVICE ID = 2 | CHUNK OF MEMORY DEVICE ID = 12 |
| 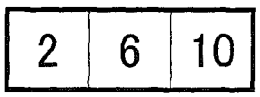 | 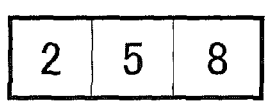 |
| CHUNK OF MEMORY DEVICE ID = 3 | CHUNK OF MEMORY DEVICE ID = 13 |
|  |  |

FIG.6

CONTENT-FILE

| 0 | 1 | 2 | 3 | 4 | 5 | 6 | 7 | 8 | 9 | 10 | 11 |

CHUNK IN CONTENT-FILE

| 0 | 3 | 6 | 9 |

| 1 | 4 | 7 | 10 |

| 2 | 5 | 8 | 11 |

CHUNK OF MEMORY DEVICE ID = 1

| 0 | 3 | 6 | 9 |

CHUNK OF MEMORY DEVICE ID = 4

| 0 | 3 | 6 | 9 |

CHUNK OF MEMORY DEVICE ID = 2

| 1 | 4 | 7 | 10 |

CHUNK OF MEMORY DEVICE ID = 5

| 1 | 4 | 7 | 10 |

CHUNK OF MEMORY DEVICE ID = 3

| 2 | 5 | 8 | 11 |

CHUNK OF MEMORY DEVICE ID = 6

| 2 | 5 | 8 | 11 |

FIG.8

| | | | | |
|---|---|---|---|---|
| ENTRY 1: | MEMORY DEVICE ID | CHUNK ACCESS ID | OFFSET ADDRESS IN CHUNK | READ SIZE |
| ENTRY 2: | MEMORY DEVICE ID | CHUNK ACCESS ID | OFFSET ADDRESS IN CHUNK | READ SIZE |
| | ⋮ | ⋮ | ⋮ | ⋮ |
| ENTRY n: | MEMORY DEVICE ID | CHUNK ACCESS ID | OFFSET ADDRESS IN CHUNK | READ SIZE |

FIG.10

| | WRITE SIZE | OFFSET ADDRESS IN CHUNK | NUMBER OF COPIES | MEMORY DEVICE ID | CHUNK ACCESS ID | MEMORY DEVICE ID | CHUNK ACCESS ID | ... | MEMORY DEVICE ID | CHUNK ACCESS ID |
|---|---|---|---|---|---|---|---|---|---|---|
| ENTRY 1: | WRITE SIZE | OFFSET ADDRESS IN CHUNK | NUMBER OF COPIES | MEMORY DEVICE ID | CHUNK ACCESS ID | MEMORY DEVICE ID | CHUNK ACCESS ID | ... | MEMORY DEVICE ID | CHUNK ACCESS ID |
| ENTRY 2: | | | | | | | | | | |
| ... | .. | .. | .. | .. | .. | .. | .. | .. | | |
| ENTRY n: | WRITE SIZE | OFFSET ADDRESS IN CHUNK | NUMBER OF COPIES | MEMORY DEVICE ID | CHUNK ACCESS ID | | | ... | MEMORY DEVICE ID | CHUNK ACCESS ID |

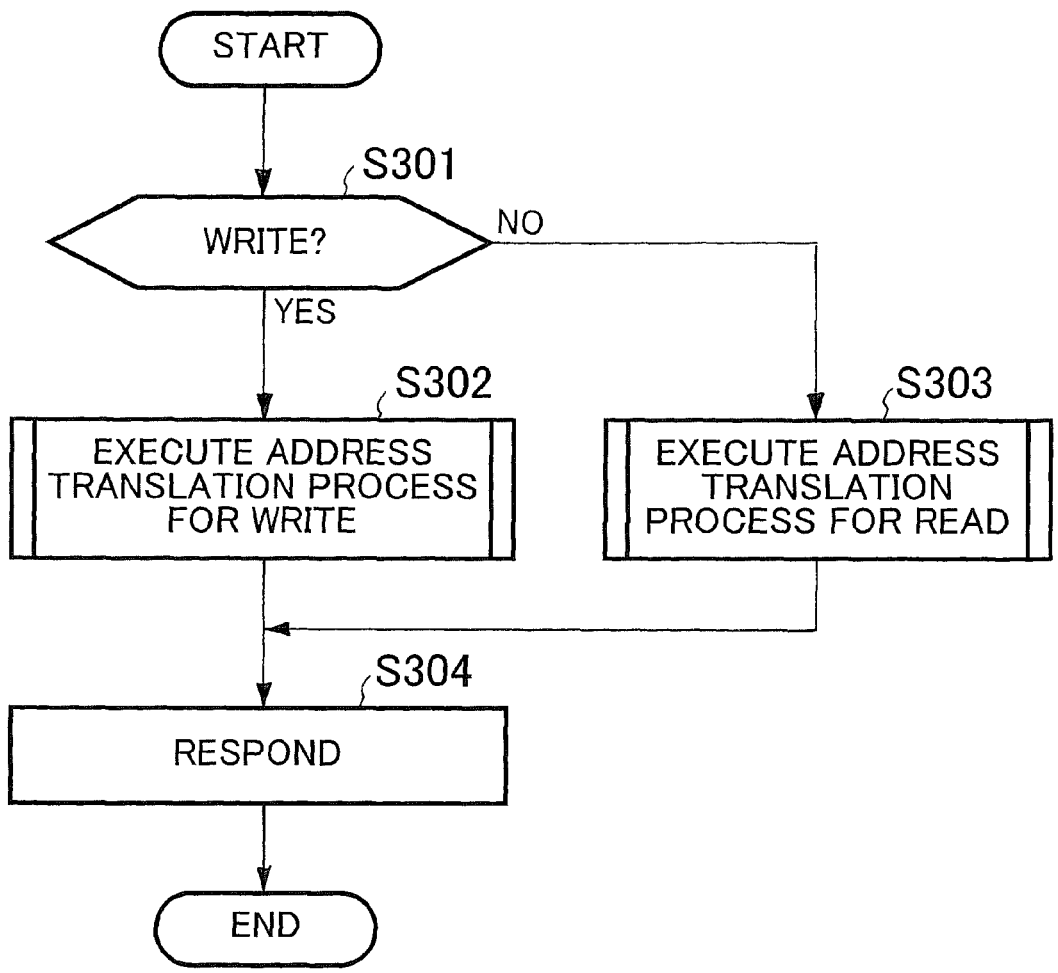

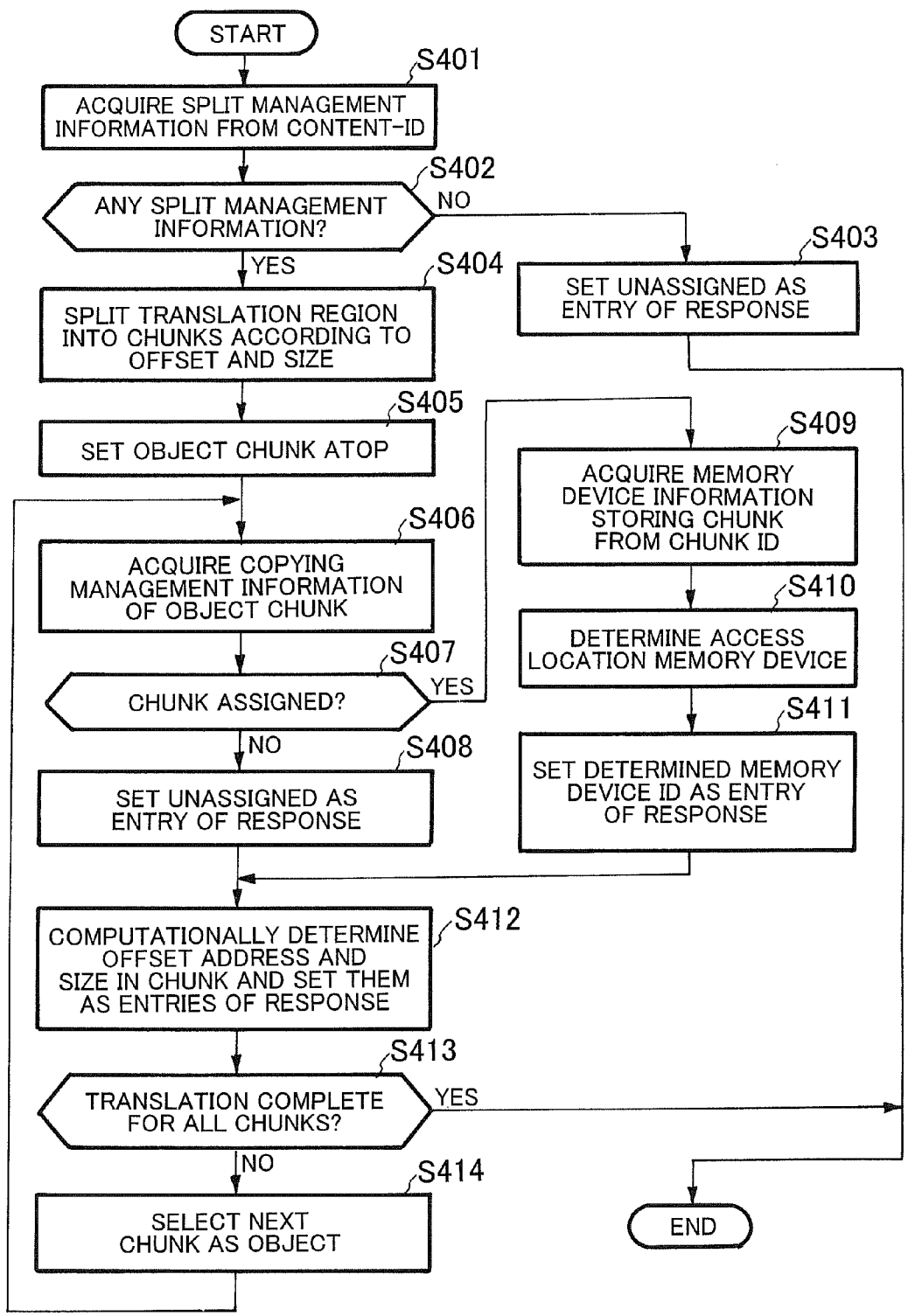

FIG.13

| | OFFSET ADDRESS IN CHUNK | READ SIZE | NUMBER OF COPIES | MEMORY DEVICE ID | CHUNK ACCESS ID | ... | MEMORY DEVICE ID | CHUNK ACCESS ID |
|---|---|---|---|---|---|---|---|---|
| ENTRY 1: | OFFSET ADDRESS IN CHUNK | READ SIZE | NUMBER OF COPIES | MEMORY DEVICE ID | CHUNK ACCESS ID | ... | MEMORY DEVICE ID | CHUNK ACCESS ID |
| ENTRY 2: | OFFSET ADDRESS IN CHUNK | READ SIZE | NUMBER OF COPIES | MEMORY DEVICE ID | CHUNK ACCESS ID | ... | MEMORY DEVICE ID | CHUNK ACCESS ID |
| | .. | .. | .. | .. | .. | .. | | |
| ENTRY n: | OFFSET ADDRESS IN CHUNK | READ SIZE | NUMBER OF COPIES | MEMORY DEVICE ID | CHUNK ACCESS ID | ... | MEMORY DEVICE ID | CHUNK ACCESS ID |

FIG.14

| | OFFSET ADDRESS IN CHUNK | READ SIZE | NUMBER OF COPIES | CHUNK ACCESS ID | MEMORY DEVICE ID | ... | MEMORY DEVICE ID |
|---|---|---|---|---|---|---|---|
| ENTRY 1: | | | | | | | |
| ENTRY 2: | OFFSET ADDRESS IN CHUNK | READ SIZE | NUMBER OF COPIES | CHUNK ACCESS ID | MEMORY DEVICE ID | ... | |
| | .. | .. | .. | .. | .. | .. | |
| ENTRY n: | OFFSET ADDRESS IN CHUNK | READ SIZE | NUMBER OF COPIES | CHUNK ACCESS ID | MEMORY DEVICE ID | ... | MEMORY DEVICE ID |

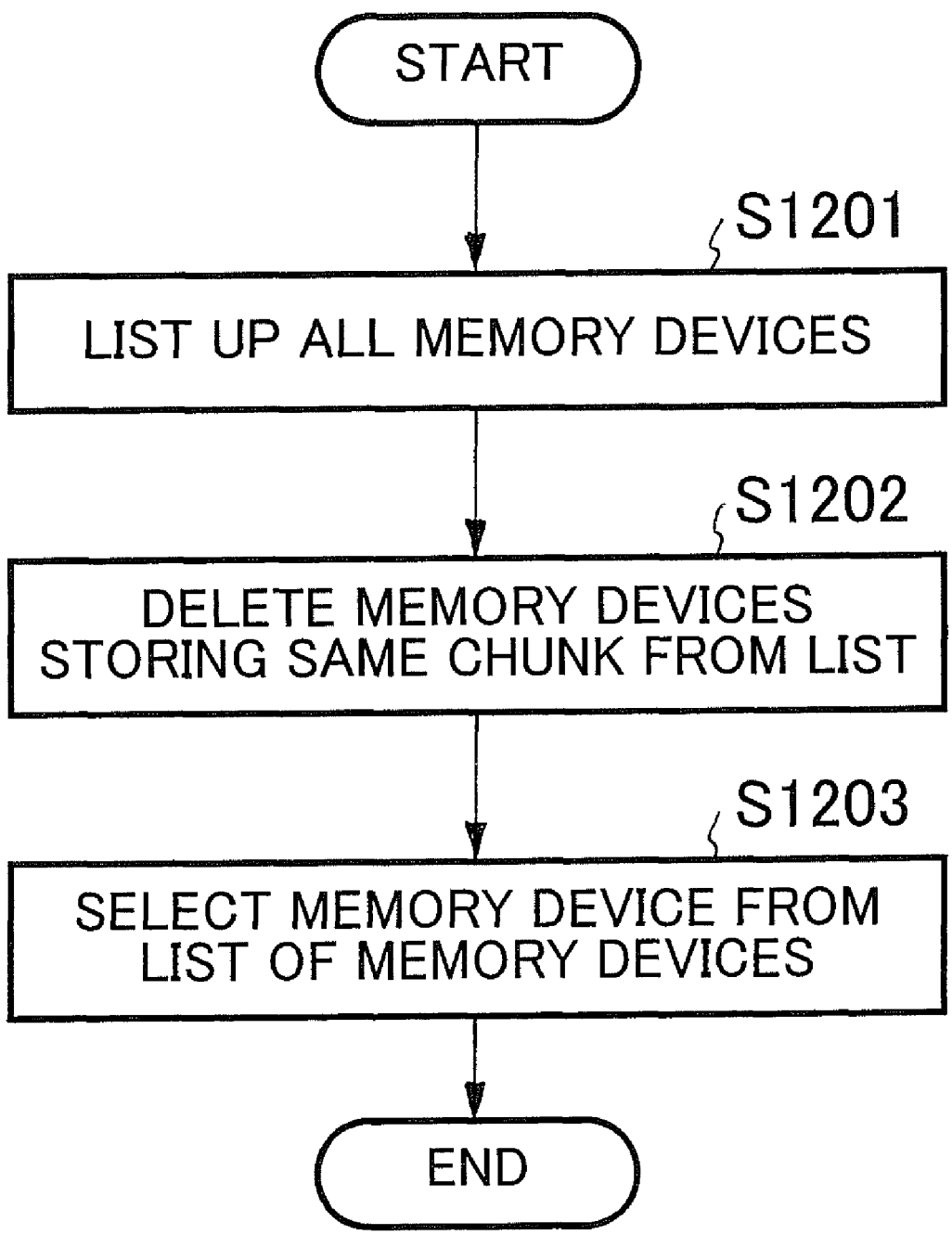

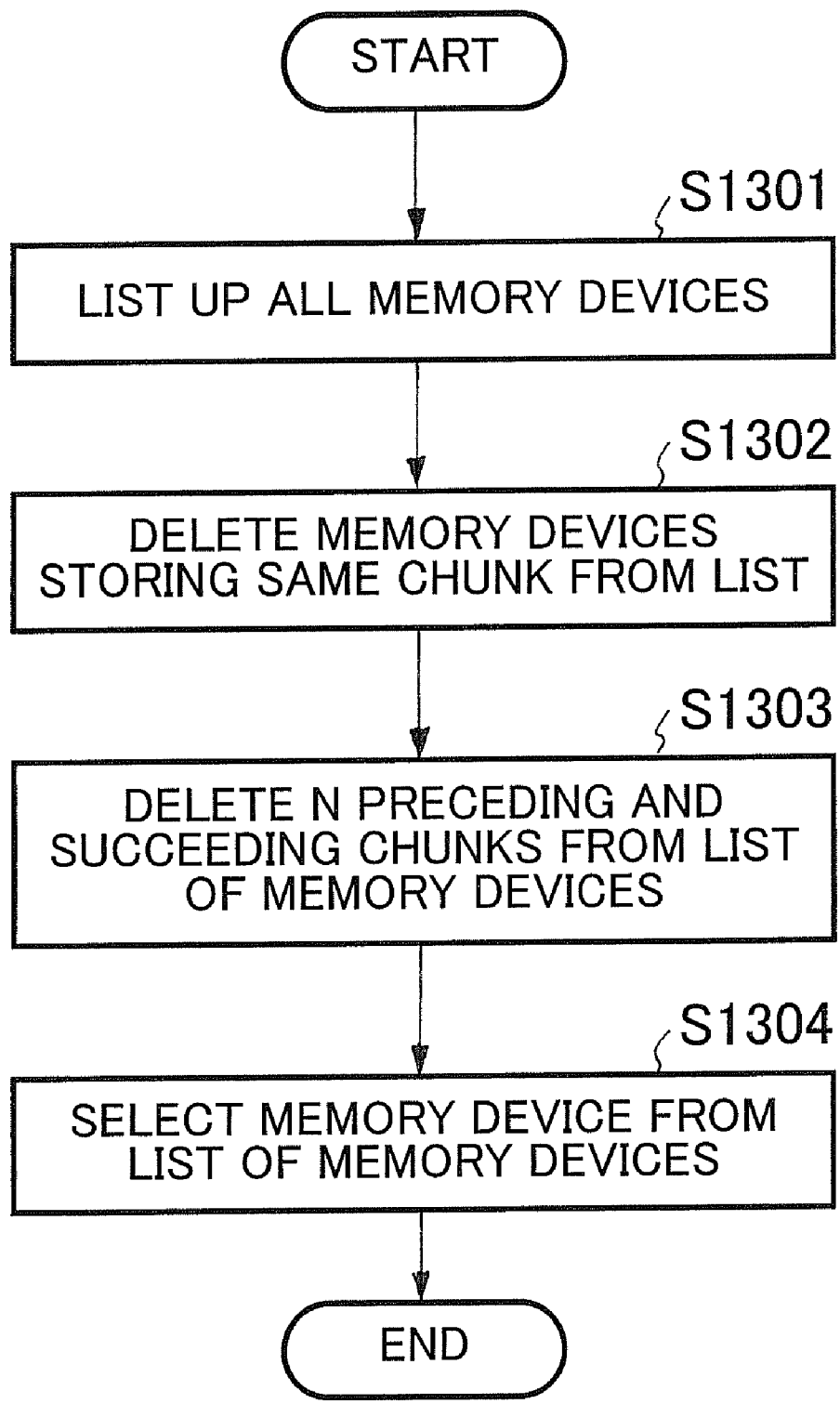

DISTRIBUTED DATA STORAGE SYSTEM, DATA DISTRIBUTION METHOD, AND APPARATUS AND PROGRAM TO BE USED FOR THE SAME

This application is based upon and claims the benefit of priority from Japanese patent application No. 2007-040093 filed on Feb. 20, 2007, the disclosure of which is incorporated herein in its entirety by reference.

BACKGROUND OF THE INVENTION

1. Field of the Invention

The present invention relates to a distributed data storage system, a data distribution method, a split data management apparatus, a host terminal and a data distributing program. More particularly, the present invention relates to a distributed data storage system, a data distribution method, a split data management apparatus, a host terminal and a data distributing program for distributing data among and storing them in a plurality of memory devices.

2. Description of the Related Art

In data distribution methods for dividing data into a plurality of data and distributing them to a plurality of memory devices, there are known methods for dividing data forming a plurality of content-data and storing them in a plurality of memory devices for the purpose of reproducing them by streaming. For example, Patent Document 1 (JP-A-2002-244893) describes a data control method for continuously dividing a series of significant data processed as a data stream among and writing them in a plurality of files (corresponding magnetic disk apparatus). Patent Document 2 (JP-A-09-223049) describes a disk array apparatus for controlling the arrangement of continuous file blocks on a file so as to assign them to separate physical block groups. Patent Document 3 (Japanese Patent No. 3052877) describes a disk array apparatus adapted to decide the locations for assigning split data such that, when the order of specifying virtual addresses is clear, the memory devices of the apparatus are accessed evenly and accesses by a plurality of clients to the group of memory devices is not concentrated to a same memory device.

Additionally, methods for not only dispersing data but also making data redundant have been developed and one of such methods is described in Non-Patent Document 1 (John L. Hennessy, David A. Paterson, "Computer Architecture: A Quantitative Approach", 3rd Edition, Morgan Kaufmann Pub. 2001, pp. 707). Non-Patent Document 1 discloses a method of dispersing data and making data redundant on a block storage level for RAID1+0 and RAID0+1. Patent Document 4 (Japanese Patent No. 2853624) discloses a method of evenly dispersing a copied data block among and storing them in other memory device in accordance with addresses.

Patent Document 5 (JP-A-11-085604) proposes a method of copying content-data and rearranging the locations of content-data and other sets of content-data before the access load gets to the limit level.

However, while the methods described in Patent Documents 1 through 3 can improve the throughput by dividing a data into a plurality of data and distributing and storing them among a plurality of memory devices, no considerations are taken into account for dealing with failures. Additionally, the method described in Patent Document 2 requires that the corresponding relationship between a logical block and a physical block is defined in advance and hence entails a problem that it is difficult to add a hard disk once a disk array is configured.

On the other hand, while the technique of distributing data on a block by block basis as described in Non-Patent Document 1 provides an advantage of improving the durability (reliability) in failures by making data redundant, it does not necessarily improve the throughput because no considerations are taken into account for efficiently exploiting the benefit of parallel accesses to same content-data since data are not recognized as content-data when they are distributed on a block by block basis.

When, for example, a file system adapted to distribute data on a block by block basis is set up on storages, the file system does not recognize any part of a virtual block device that is assigned to an actual block device. In other words, if content-data (file) is assigned to a plurality of virtual block devices, there is no guarantee that it is assigned to a plurality of physical block devices.

While the method described in Patent Document 4 takes considerations on dealing with failures into account, the capacity efficiency of memory devices is not particularly good because memory devices to be used for normal operations and memory devices to be used in failures are separately provided. Additionally, since data that correspond to a memory device (and hence data same as those stored in the memory device) are stored in some other memory device, there arises a problem that the access performance of the method cannot be maintained in a failure and at the time of recovering from the failure. For example, when a memory device is in a failure, only the memory device storing the same data has to bear the load of accessing the data stored in the failed memory device. When another memory device is added to replace the failed memory device, only the memory device storing the data same as those of the failed memory device has to bear the load of the process of copying the data to the added memory device until the copying process ends. Thus, if the copying process is executed while limiting the throughput, the access performance of the memory device falls for a long time due to the time spent for the copying process.

Furthermore, the method described in Patent Document 4 is accompanied by a problem that it is difficult to add a new hard disk once a disk array is configured because the assignment of data (including copy data) is determined on the basis of addresses.

While the method described in patent Document 5 can improve the throughput after a reallocation by making it correspond to demands, no considerations are taken into account on maintaining the access performance at the time of adding and reallocating copy data.

In short, firstly the known data distribution methods are accompanied by a problem that the demand for improving the reliability and the demand for improving the throughput cannot be met simultaneously without reducing the capacity efficiency. The second problem is that the access performance cannot be maintained in operations other than ordinary operations such as those in failures, those of adding copy data and those of reallocating data. The third problem is that no considerations are taken into account on improving the scalability such as adding new memory devices.

SUMMARY OF THE INVENTION

In view of the above-identified problems, it is therefore an object of the present invention to realize improved characteristics and improved performances of data distribution. More specifically, the object of the present invention is to provide a distributed data storage system and a data distribution method that can improve both reliability and throughput at the same time and an apparatus and a program to be used for the same. Another object of the present invention is to provide a distributed data storage system and a data distribution method that can maintain the access performance thereof in operations other than normal operations and also an apparatus and a program to be used for the same. Still another object of the present invention is to provide a distributed data storage system and a data distribution method that can improve the scalability such as adding new memory devices and also an apparatus and a program to be used for the same.

In an aspect of the present invention, there is provided a distributed data storage system for splitting content-data into a plurality of split data and storing a plurality of copy data corresponding to at least one of the plurality of split data in a plurality of memory devices. The system comprise: copying management information storing means for storing copying management information indicating a storage location of the copy data corresponding to the split data; and access location determining means for determining at least one of the plurality of memory devices storing the copy data corresponding to the split data as an access location for accessing split data.

BRIEF DESCRIPTION OF THE DRAWINGS

FIG. 3 is a schematic illustration of split management information;

FIG. 4 is a schematic illustration of copying management information;

FIG. 5 is a schematic illustration of exemplary concatenation results of chunk-data;

FIG. 6 is a schematic illustration of other exemplary concatenation results of chunk-data;

FIG. 8 is a schematic illustration of an exemplary response format that can be used for an address translation request for a read;

FIG. 10 is a schematic illustration of an exemplary response format that can be used for an address translation request for a write;

FIG. 11 is an exemplary process flowchart of an address translation process at the chunk management section 3;

FIG. 12 is a flowchart of an exemplary process flowchart of an address translation process for a read;

FIG. 13 is a schematic illustration of another exemplary response format that can be used for an address translation request for a read;

FIG. 14 is a schematic illustration of still another exemplary response format that can be used for an address translation request for a read;

FIG. 22 is an exemplary process flowchart of a chunk assignment process at the chunk management section 3; and FIG. 23 is an exemplary process flowchart of another chunk assignment process at the chunk management section 3.

DETAILED DESCRIPTION OF THE PREFERRED EXEMPLARY EMBODIMENTS

Firstly, an overview of the present invention will be described. In a distributed data storage system for splitting content-data into a plurality of data and storing them according to the present invention, two or more copies are formed for each data produced by a split and all the available memory devices are used as candidates for assignment locations regardless if each memory device is for ordinary operations or for failures so that the same data produced by a split are assigned to and stored in different memory devices. Further, not only the same data produced by a split are stored in different memory devices but also assignment locations are determined so as to reduce the correlation among the memory devices (the number of data produced by a split that are shared by any two memory devices). Furthermore, when content-data where the continuity of data is high such as content-data for streaming reproduction is to be handled, assignment locations of continuous data that are produced by a split are determined such that they are not stored in a same memory device in accordance with the data size at which content-data may highly probably be accessed at a time (for example, equivalent to the buffer amount used for access).

The process of determining the access location for the same split data, the process of recovering from a failure and the process of altering the number of copies are executed only after distributing data to memory devices according to the determined assignment locations.

Now, the definitions of some of the terms that are used in the description of the present invention will be defined below. In the present invention, "content(S) or content(S)-data" refer to a group of data to be distributed and stored. For example, content-data may be data collected in one file. In the present invention, "split data" refer to a plurality of data produced by splitting content-data. The size of split data may not necessarily be fixed and therefore, may vary depending on content-data or each of the plurality of split data. When, for example, encoded content-data such as sound or image data are to be handled, the size of split data may be that of a unit of its encoding or a set of a plurality of units of its encoding.

First Exemplary Embodiment

Figure 1:
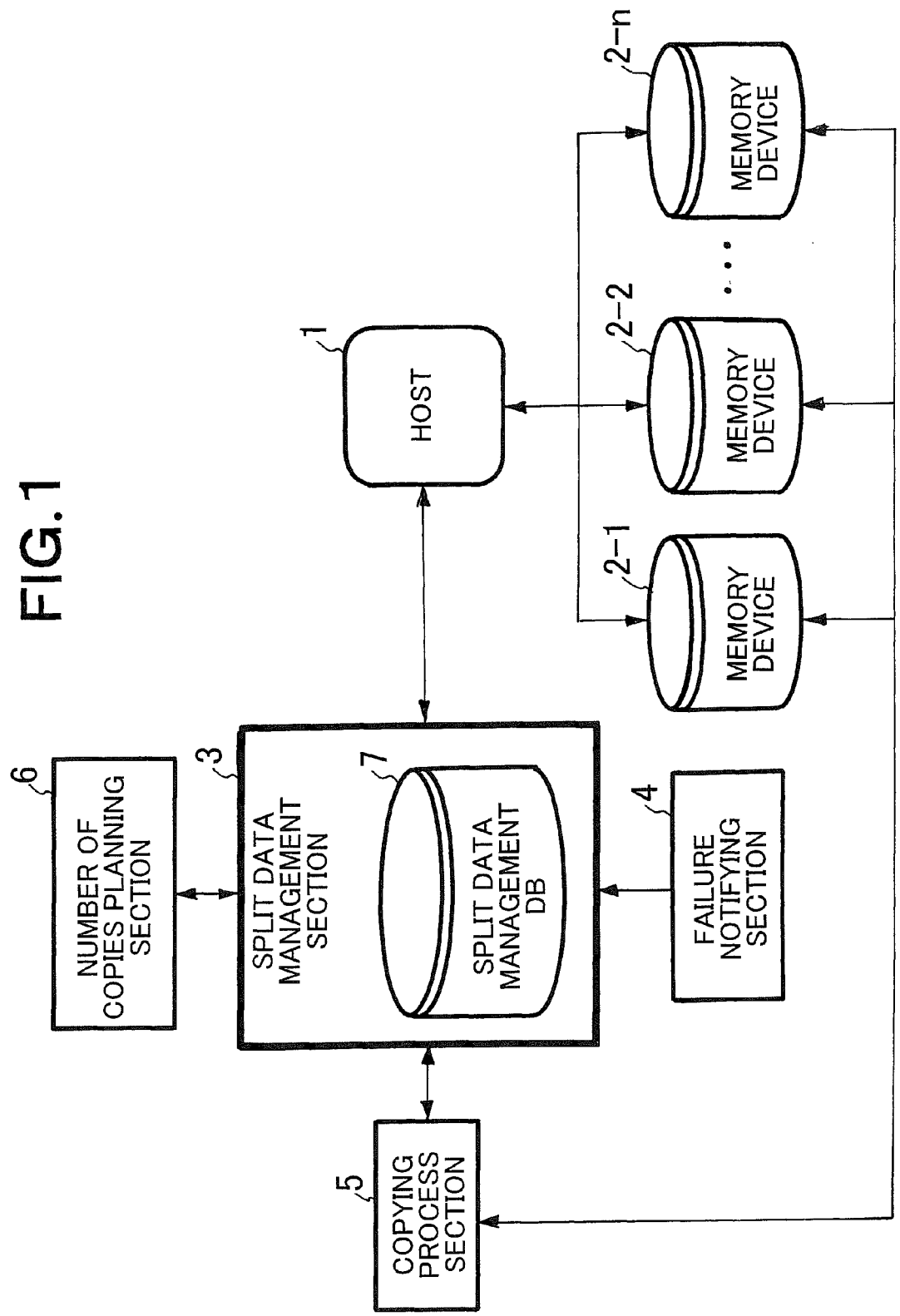
FIG. 1 is a schematic block diagram of a distributed data storage system according to an exemplary embodiment of the present invention, showing the configuration thereof.

Now, the present invention will be described by referring to the accompanying drawings that schematically illustrate the first exemplary embodiment of the present invention. FIG. 1 is a schematic block diagram of a distributed data storage system according to the first exemplary embodiment of the present invention, showing the configuration thereof. The distributed data storage system illustrated in FIG. 1 has a host 1, a plurality of memory devices 2 (memory devices 2-1 through 2-n, where n is a natural number), a split data management section 3, a failure notifying section 4, a copying process section 5, a number of copies planning section 6 and a split data management database (split data management DB) 7. While a single host 1 is shown in FIG. 1, there may be a plurality of hosts depending on the number of users who utilize this system.

The host 1 is a user terminal for accessing content-data distributed among a plurality of memory devices 2. The memory devices 2 are devices for storing distributed content-data. Each of the memory devices 2 stores split data produced by splitting content-data for distribution and copies thereof.

The split data management section 3 manages the plurality of assignment locations of the copy data that correspond to the split data produced by splitting content-data. Note that the split data management section 3 manages the assignment locations of a plurality of copies, or a plurality of copy data, of each split data of content-data according to the number of copies. Copy data refers to data same as split data produced by splitting content-data and actually stored in a memory device. In the present invention, "split data" is employed to express a logical split data of content-data, whereas "copy data" is employed to express a physical split data actually stored in a memory device. The split data management section 3 may not only determine the assignment locations for distributing and locating the copy data that correspond to each split data of content-data in a plurality of memory devices and manages the assignment locations but also manage the assignment locations where copy data are already distributed and located. More specifically, the assignment location management of the split data management section includes determining the memory device to be accessed for split data, altering the number of copies, adding one or more than one memory devices, maintaining the number of copies (including addition, deletion and relocation of copy data) if any of the memory devices become disabled.

Alternatively, the host 1 may have the function of determining the memory device to be accessed for split data (to be referred to simply as access location determining function hereinafter). If such is the case, the split data management section 3 may be adapted to notify the host 1 of information indicating the assignment locations of the copy data that correspond to a desired split data.

The failure notifying section 4 notifies the split data management section 3 of any failure of each memory device 2 (if the memory device 2 is enabled or disabled to be more specific). The copying process section 5 executes access processes including adding the split data to, deleting the split data from the memory device 2 and copying the split data. The number of copies planning section 6 determines the number of copies of each split data. The split data management database DB 7 is a memory device for storing information necessary for managing the locations of the copy data that correspond to each split data. The split data management DB 7 stores information on the correlation of the content-data and split data, information on the assignment locations of copy data, information on the memory devices to which copy data can be assigned and so on.

In the following description of this exemplary embodiment, split data is referred to as "chunk or chunk-data". While the "chunk or chunk-data" may generally refer to split data that is meaningful, it also refers to a meaningless split data for the purpose of this exemplary embodiment. In other words, "chunk or chunk-data" is not limited to a meaningful split data.

Figure 2:
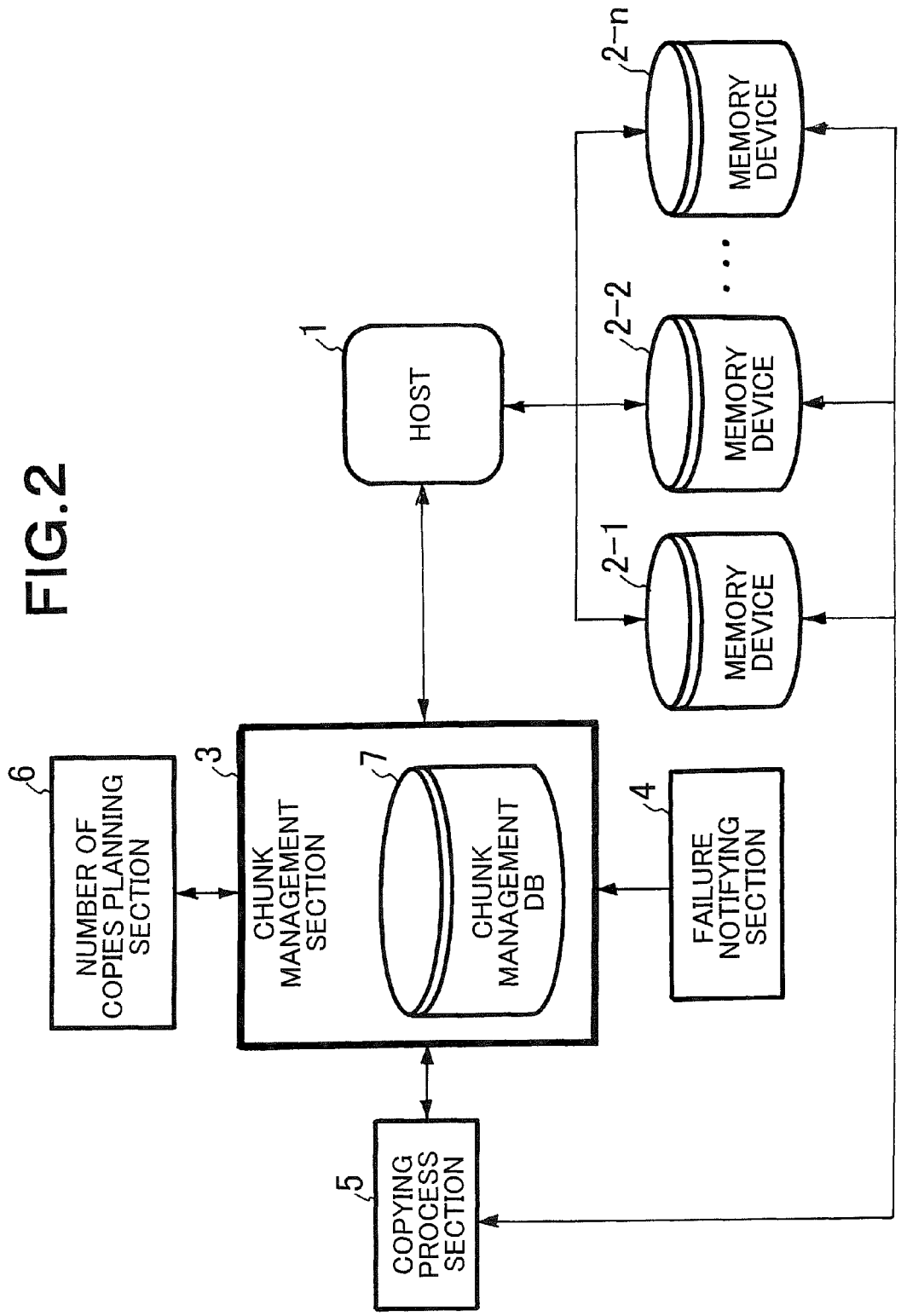
FIG. 2 is a schematic block diagram of the distributed data storage system according to the exemplary embodiment of the present invention, showing the configuration thereof.

FIG. 2 is a schematic block diagram of the distributed data storage system according to the exemplary embodiment of the present invention, showing the configuration thereof. As shown in FIG. 2, the distributed data storage system of this exemplary embodiment has a host 1, a plurality of memory devices 2 (memory devices 2-1 through 2-n, where n is a natural number), a chunk management section 3, a failure notifying section 4, a copying process section 5 and a number of copies planning section 6. While a single host 1 is shown in FIG. 2, there may be a plurality of hosts in this exemplary embodiment depending on the number of users who utilize this system.

The host 1 is specifically a data processing apparatus for accessing content-data distributed among a plurality of memory devices 2. In this exemplary embodiment, the host 1 can access any necessary chunk-data according to the chunk locating information that indicates the memory device 2 storing the chunk-data.

The memory devices 2-1 through 2-n are memory devices storing chunk-data. The memory devices 2-1 through 2-n are not limited to block-based memory devices and may alternatively be file-based memory device systems such as NAS or object-based memory device systems such as ODS (object-based storage devices). Then, the chunk-data are stored as files or objects, whichever appropriate, if such is the case. Note that the memory devices 2-1 through 2-n include control units for controlling the memory devices. For example, the memory devices 2-1 through 2-n may be realized by a server apparatus including magnetic memory devices, magneto-optical memory devices and/or nonvolatile semiconductor memory devices along with an array device of such memory devices and a control unit for controlling them. The memory devices 2-1 through 2-n are provided with respective memory device IDs for identifying them.

For the purpose of this exemplary embodiment, it is not necessary to determine whether chunk-data stored in a memory device is a copy or not. In other words, chunk-data of content-data and a plurality of chunk-data same as the former chunk-data are stored in memory devices. In the following description, the expression of "each chunk or chunk-data" may refer to each chunk of content-data or a chunk that may be a copy stored in a memory device of such a chunk. A chunk or chunk-data to be stored in a memory device may be expressed as "a copy chunk or chunk-data" in order to discriminate chunk-data to be identified in content-data and chunk-data among a plurality of chunk-data that are actually to be stored in a plurality of memory devices.

The chunk management section 3 manages assignment locations of a plurality of copies of each chunk-data of content-data. In the exemplary embodiment, the chunk management section 3 splits content-data into a plurality of chunk-data and determines and manages a plurality of assignment locations for each chunk-data. Alternatively, however, the chunk management section 3 may be adapted to manage the assignment locations of chunk-data where they are already distributed without determining a plurality of assignment locations for each chunk-data of content-data. The chunk management section 3 has a chunk management database 7 (to be referred to as chunk management DB 7 hereinafter) for managing the assignment locations of each chunk-data. However, the chunk management DB 7 may be provided as an independent database system. If such is the case, it is only necessary that at least the chunk management section 3 and the copying process section 5 are accessibly connected to the chunk management DB 7.

The chunk management section 3 deletes, adds or copies a chunk-data (for relocation) at a predetermined timing such as when the number of copies of chunk-data is altered, when a failure takes place or when a notification is received from some other processing section. Note, however, the chunk management section 3 only determines the assignment locations where each chunk-data is to be assigned and the referrer of chunk-data and the copying process section 5 is responsible for actual distribution to memory devices. For example, when a request for accessing content-data is received from the host 1, the chunk management section 3 determines locations to be accessed for chunk-data of the content-data. Alternatively, the host 1 may have the function of determining locations to be accessed. Then, the chunk management section 3 may notify the host 1 of information on the memory devices storing copy chunk-data of each chunk-data of content-data.

The failure notifying section 4 notifies the chunk management section 3 of any of the memory devices 2-1 through 2-n disabled due to a failure or the like. The failure notifying section 4 may be a detection means for detecting the failure of any of the memory devices or an input means (e.g., a key input means) for inputting a counter-failure command according to a corresponding operation of the system manager.

The copying process section 5 executes a process in response to a command from the chunk management section 3. The process may be that of adding chunk-data to or deleting chunk-data from any of the memory devices 2-1 through 2-n or copying chunk-data from a memory device to another memory device.

The number of copies planning section 6 determines the number of copies of each chunk-data according to the situation of the system. For example, it is a means for determining the number of copies of each chunk-data according to the demand for content-data, the predicted demand for content-data, the available number (the number determined to ensure that some of the same chunk-data remain without being lost in the case of a failure) and so on and, if the number of copies is changed, making the chunk management section 3 alter the chunk management information.

The chunk management DB 7 stores information on the correlation of content-data and chunk-data, on the assignment locations where copy chunk-data are assigned and on the memory devices to be used as assignment locations. More specifically, it stores split management information of each content-data that the system handles, copying management information of each chunk-data and memory device information.

The chunk management section 3, the copying process section 5 and the number of copies planning section 6 are realized by one or more information processing devices that operate according to a program of a CPU or the like. The chunk management section 3, the copying process section 5 and the number of copies planning section 6 may be realized by respective information processing devices or by a single information processing device. However, the chunk management section 3 is preferably realized by an information processing device that is different from the other process sections (the copying process section 5 and the number of copies planning section 6) in order to minimize the influence on ordinary accesses.

Split management information refers to information indicating what chunk-data each content-data is split into. For example, split management information includes chunk reference information on each of chunk-data of content-data (not including copy chunk-data). More specifically, chunk reference information includes a chunk content-ID for identifying chunk-data in content-data and information indicating data in content-data that corresponds to chunk-data (for example, the starting offset, chunk size, and the like). However, chunk reference information may not include a chunk content-ID when the chunk content-ID can be identified according to an entry order of chunk reference information because, for instance, the chunk reference information is registered according to the order of content-data. When a chunk size is fixed for all chunk-data, the chunk size may not be registered as chunk reference information of each chunk-data so long as the split management information includes the chunk size that is common to all chunk-data.

Copying management information refers to information at least indicating the memory devices where the same chunk-data (and hence copy chunk-data of the chunk-data) are stored for each of chunk-data of each content-data. For example, copying management information includes a chunk content-ID assigned to each of chunk-data of content-data, the number of copies of chunk-data and assignment locations of copy chunk-data of the chunk-data. Information on the assignment locations of the chunk-data (copy chunk-data) includes memory device IDs for identifying memory devices storing chunk-data, access information (a block number and offset or chunk access ID for identifying chunk-data in a memory device) necessary for accessing each chunk-data in the memory device.

Memory device information refers to information indicating the available memory devices in the system. For example, the memory device information includes memory device IDs for identifying memory devices of the system and its operating condition (in operation or at rest) and storage capacity of each of memory devices.

Now, a content management method of the chunk management section 3 will be described below. Each content-data is uniquely identified by a content-ID specified in the system to identify content-data. Each of chunk-data of content-data is uniquely identified by a chunk content-ID specified in content-data to identify chunk-data.

Each of chunk-data (copies of chunk-data) in a memory device is uniquely identified by a chunk access ID which may be a file name, a pass name, an inode number or an object ID. Since the same chunks are assigned to different memory devices according to the present invention, each copy chunk-data can be uniquely identified by a memory device ID and a chunk access ID. If a chunk access ID that is common to all the memory devices can be assigned to all the same copy chunk-data, the chunk content-ID of the corresponding chunk-data can operate as the chunk access ID. If such is the case, copy chunk-data of chunk-data that is identified by a chunk content-ID can be uniquely identified by a memory device ID.

Firstly, the management method for not correlating a content-ID with a chunk content-ID will be described below. The chunk management section 3 manages content-data to be managed as chunk-data by associating split management information as shown in FIG. 3 with a content-ID and storing them in the chunk management DB 7.

FIG. 3 is a schematic illustration of split management information shown as an example. Referring to FIG. 3, the chunk management section 3 may store chunk reference information of chunk-data produced by splitting content-data in the order of splitting content-data in association with the content-ID of content-data as split management information of content-data. For example, chunk reference information of the first chunk-data is registered as the first entry of the split management information on content-data. The chunk management section 3 may store such split management information on each content-data in the chunk management DB 7.

When the size of chunk-data in content-data is of a fixed length, it is sufficient for chunk reference information of the each of the chunk-data to include the chunk content-ID of the chunk-data. For example, if the chunk size is c and the chunk of the data whose offset address is a on content-data, chunk-data can be identified as chunk-data indicated by the chunk content-ID contained in chunk reference information that is registered as the a/c-th (with omission of fraction) entry in the split management information. Note that the storage location of actual data is obtained by referring to the copying management information of the chunk based on the chunk content-ID. The chunk size is registered in the split management information as a common value.

When chunk-data of content-data have respective sizes that are different from each other, it is sufficient for the chunk reference information of each of the chunk-data to contain the chunk content-ID of the chunk-data and the chunk size. For example, if the chunk size of the j-th chunk-data in content-data is cj and chunk-dada of data whose offset address is a on content-data, can be identified as chunk-data indicated by the chunk content-ID contained in the chunk reference information that is registered as the i-th entry expressed by the formula (1) shown below:

$$\sum_{j=0}^{i} c_j - c_i \le a < \sum_{j=0}^{i} c_j. \qquad \text{formula (1)}$$

Now, the management method for correlating a content-ID with a chunk content-ID will be described below. With this method, the chunk content-ID of chunk-data is identified by the content-ID and the location of chunk-data in content-data. Therefore, the chunk reference information of each of chunk-data may not contain the chunk content-ID. In the chunk content-ID, several higher order bits may be used as content-ID and the remaining lower order bits may be used to indicate the ordinal number of chunk-data in content-data.

When the size of chunk-data in content-data is of a fixed length, the chunk reference information of each of chunk-data may be omitted. In other words, the split management information may be realized as a table storing the chunk size of chunk-data of content-data. When the size of chunk-data of all content-data is of a fixed length, it is not necessary for each content-data to have split management information and the split management information of the system may be realized as a single data showing the chunk size. When chunk-data of content-data have respective sizes that are different from each other, it is sufficient for the chunk reference information of each of chunk-data to be registered simply as the chunk size in the split management information. In other words, the split management information may be realized as a table storing the sizes of chunk-data. The chunk-data indicated by an offset address on content-data can be recognized by identifying a chunk content-ID that indicates the position of chunk-data as entry position as described above.

Now, a method of managing assignment locations of chunk-data by the chunk management section 3 will be described below. The chunk management section 3 manages the location of each of chunk-data by storing copying management information in the chunk management DB 7 in association with a chunk content-ID thereof as shown in FIG. 4.

FIG. 4 is a schematic illustration of copying management information shown as an example. Referring to FIG. 4, it is only necessary for the chunk management section 3 to store the memory device IDs of the memory devices storing chunk-data same as the chunk-data (and hence the copy chunk-data) in association with the chunk content-ID of the chunk-data as copying management information of chunk-data. In other words, it is sufficient to store information necessary for accessing the chunk-data in the memory devices in addition to the memory device IDs. Such information may typically include address information and the identifiers (the chunk access IDs) specific to the respective memory devices. Copying management information may additionally include the number of copies of the chunk-data. The chunk management section 3 may store the copying management information on each of the chunk-data forming each content-data in the chunk management DB 7.

The chunk management section 3 can concatenate a plurality of chunk-data in content-data and manages them as a single chunk-data. Chunk-data may be concatenated in a memory device or in content-data.

With a method of concatenating chunk-data in a memory device, a single chunk access ID is assigned to a plurality of chunk-data stored in a same memory device out of the chunk-data of content-data. For example, content-data may be split into chunk-data, which may be then assigned to and stored in memory devices according to an assignment pattern and the assignment pattern may be changed each time when a copying process is executed. Subsequently, chunks of each memory device may be grouped together. FIG. 5 is a schematic illustration of exemplary concatenation results of chunks. Referring to FIG. 5, when content-data is split into twelve chunk-data (chunks 0 through 11) with the number of copies of each chunk=2 and the chunk-data are stored in memory devices, a set of copies of the chunk-data is assigned to memory devices with the memory device IDs=0 through 3 and another set of copies of the chunk-data is assigned to memory devices with the memory device IDs=10 through 13. In the instance of FIG. 5, chunk-data are assigned to memory devices such that the same chunk-data are stored in different memory devices and the correlation among the memory devices is reduced by changing the memory devices, or the assignment locations, to which chunk-data are assigned and also changing the assignment pattern each time a copying process is executed. With such an assignment operation, the chunk management section 3 manages the concatenated chunks 0, 4 and 8 that are assigned to the memory device with the memory device ID=0 as a single chunk-data in the memory device. Note that an expression of concatenated chunk-data is used for chunk-data formed by concatenating two or more of chunk-data produced by splitting content-data. Similarly, the chunk management section 3 manages the concatenated chunk-data of the chunks 0, 7, 10 assigned to the memory device with the memory device ID=10 as a single chunk-data in the memory device.

More specifically, as assignment location information of chunk-data to be included in copying management information, it is only necessary to store a memory device ID of a memory device storing a concatenated chunk-data including chunk-data same as the chunk-data, information for accessing the concatenated chunk in the memory device (the chunk access ID) and information indicating the position of the chunk-data in the concatenated chunk-data (e.g., information indicating the order of concatenation, the offset address and so on). With the method of concatenating chunks at the time when they are stored in a memory device, the number of chunks and the number by which content-data is split can be managed separately to reduce the data quantity of the chunk access IDs to be managed.

With a method of concatenating chunk-data in content-data, a sing chunk content-ID is assigned to discontinued chunk-data in content-data. For example, the chunks to be put into a same memory device may be grouped when content-data is split into a plurality of chunk-data and subsequently the plurality of chunk-data are assigned with a cyclic pattern. FIG. 6 is a schematic illustration of exemplary concatenation results of chunk-data. Referring to FIG. 6, content-data is split into twelve chunk-data (chunks 0 through 11) and they are grouped cyclically, using every third chunk-data. With such an arrangement, the chunk management section 3 manages a concatenated chunk-data formed by concatenating chunk-data of the chunks 0, 3, 9, whose assignment location is the memory device with the memory device ID=1, as a single chunk-data. Similarly, the chunk management section 3 manages a concatenated chunk-data formed by concatenating chunk-data of the chunks 1, 4, 10, whose assignment location is the memory device with the memory device ID=2, as a single chunk-data.

More specifically, it is only necessary that chunk reference information for the number of concatenated chunk-data in content-data is stored as split management information and the chunk reference information of each concatenated chunk-data includes the chunk content-ID assigned to the concatenated chunk-data and the positional information on the chunk-data that are concatenated to form the concatenated chunk-data (the offset addresses on content-data and the size). With such method of concatenating chunk-data in content-data, it is not necessary to consider the continuity of data when determining the chunk size. Therefore, for instance, a size larger than the data size by which content-data may highly probably be accessed at a time may be selected as ultimate chunk size. Additionally, the data quantity of the chunk content-IDs and the chunk access IDs that the system manages can be reduced.

Figure 7:
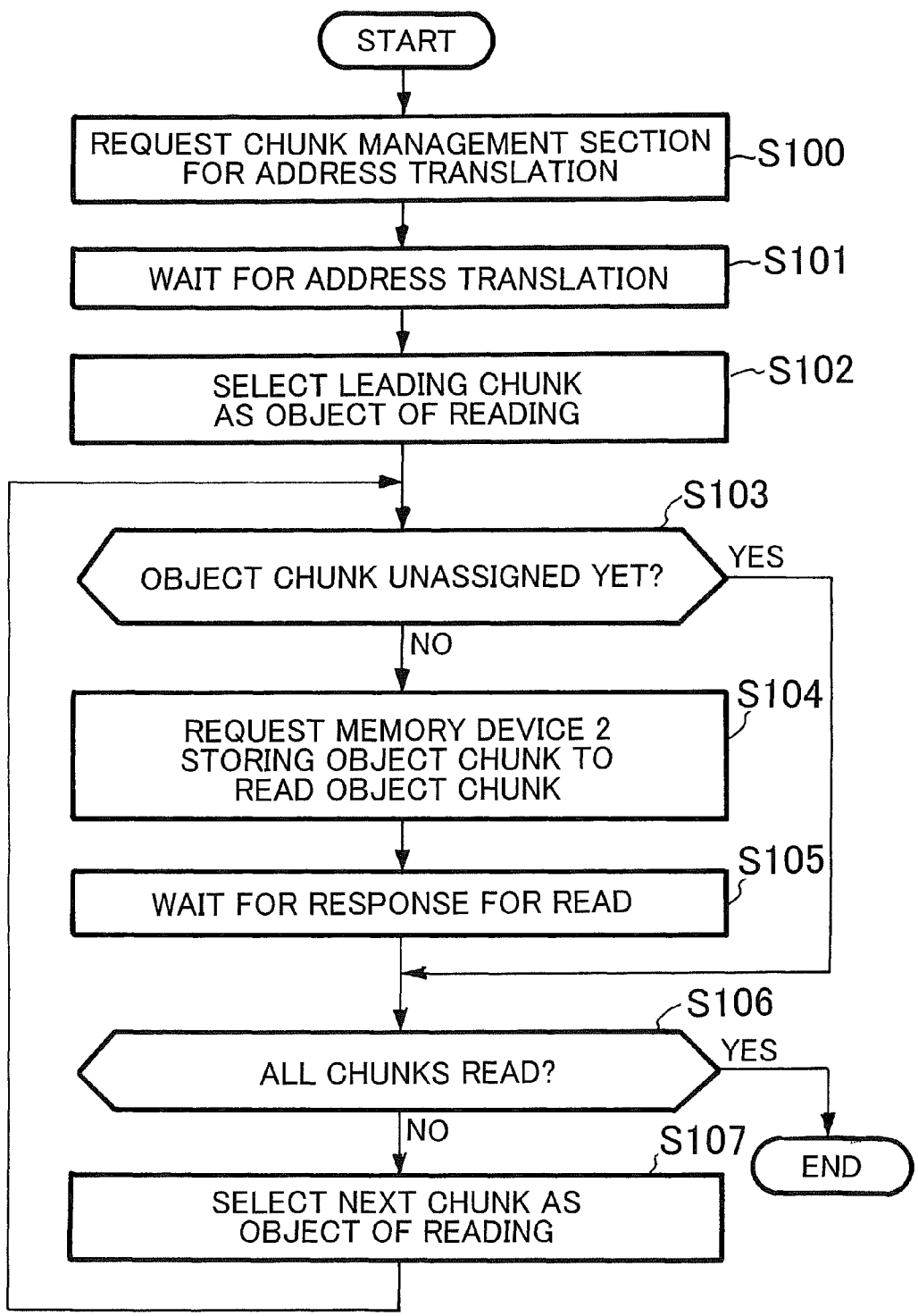
FIG. 7 is a flowchart of an exemplary content-data reading operation.

Now, the operation of the split data management system of this exemplary embodiment will be described below. Firstly, the operation of reading content-data from the host 1 will be described. FIG. 7 is a flowchart of an exemplary content-data reading operation of the split data management system of this exemplary embodiment. Assume here that the host 1 of this exemplary embodiment who reads content-data requests the chunk management section 3 to perform an address translation, specifying the content-ID of content-data it wants to read, the read starting position of content-data and the read size, and acquires in response information indicating the storage location of the chunk-data of the relevant part of content-data so as to access the memory device according to the information.

When the host 1 reads, the host 1 requests the chunk management section 3 to perform an address translation, specifying the content-ID, the offset address indicating the read starting position in content-data, the read size and that the operation is a read operation (Step S100). When the host 1 is connected to the server apparatus having the chunk management section 3 by way of a communication network, the host 1 transmits an address translation request message for the read operation that includes the content-ID, the offset address in content-data and the read size to the server apparatus. Then, the host 1 waits for a response from the chunk management section 3 (Step S101). The operation of address translation of the chunk management section 3 will be described hereinafter.

Upon receiving a response, the host 1 selects the leading entry of the response as the entry of the object of reading (Step S102). The format of the response from the chunk management section for the address translation request for a read operation is stored as a single entry for each of the chunk-data of the data of the object of reading. Each entry typically includes the memory device ID of the memory device storing the chunk-data, access information in the memory device (e.g., the chunk access ID), the read starting position in the chunk-data and the read size in the chunk-data. Assume here that the entries are stored in the order of the offset addresses of content-data in a part of the data of the response for the following description. Note that, if chunk-data is formed by concatenating a plurality of chunk-data, each of the plurality of chunk-data before they are concatenated may be used as an entry.

FIG. 8 is a schematic illustration of an exemplary response format that can be used for an address translation request for a read. In the instance illustrated in FIG. 8, each of chunk-data of the object of reading is used as an entry and the memory device ID of the memory device storing one of the same chunk-data (namely the copy chunk-data), the chunk access ID in the memory device, the read starting position in the chunk-data (the offset address in the chunk-data) and the read size in the chunk-data are stored there. In the instance illustrated in FIG. 8, entry 1 is processed by the host 1 as the entry of the object of reading.

The host 1 moves to Step S106 when the chunk-data indicated by the entry of the object of reading (to be referred to simply as object chunk-data hereinafter) is unassigned yet, whereas the host 1 moves to Step S104 when the chunk-data is assigned already (Step S103). The expression that the chunk-data is unassigned yet means that the chunk-data is not written in a memory device yet. If an object chunk-data is unassigned yet or not can be determined typically by seeing if any invalid value is stored in the memory device ID and/or the chunk access ID.

When the object chunk-data is assigned already, the host 1 requests the memory device 2 identified by the memory device ID in the entry of the object of reading to read, specifying the chunk access ID in the entry of the object of reading, the offset address in the chunk-data and the read size (Step S104). Then, the host 1 waits for a response from the memory device 2 (Step S105).

The host 1 executes the above-described read process for all the entries (all chunk-data) notified from the chunk management section 3. In other words, when the host 1 receives a response from the memory device 2, the host 1 determines if the operation of reading all the chunk-data shown in all the entries that are included in the response for an address translation from the chunk management section 3 is completed or not and, if it is completed, the host 1 ends the process, but if it is not completed, the host 1 moves to Step S107 (Step S106). In Step S107, the host 1 selects the next entry as object of reading in order to read chunk-data that is not read yet and then moves to Step S103.

In the instance illustrated in FIG. 8, entry 2 is selected as object of reading after entry 1 and the host 1 processes all the entries down to entry n as objects of reading. In this instance, since the entries are stored in the order of the offset addresses of content-data, the host 1 can acquire all the desired content-data by sequentially reading data of the chunk-data and concatenating the chunk-data according to the order of the entries of the objects of reading. When the entries are not stored in the order of offset addresses of content-data, it is sufficient for each entry to include information indicating the position where the corresponding chunk-data takes in content-data.

While the chunk-data are read sequentially in the above instance, the chunk-data may alternatively be processed for parallel reading without waiting for a response in order to reduce the processing time. Since chunk-data that are continuous in content-data are stored in respective memory devices that are different from each other as will be shown in the description of assignment locations determining operation that is given hereinafter, the host 1 can access memory devices in parallel without being particularly conscious about it so that the processing time can be reduced with ease.

Figure 9:
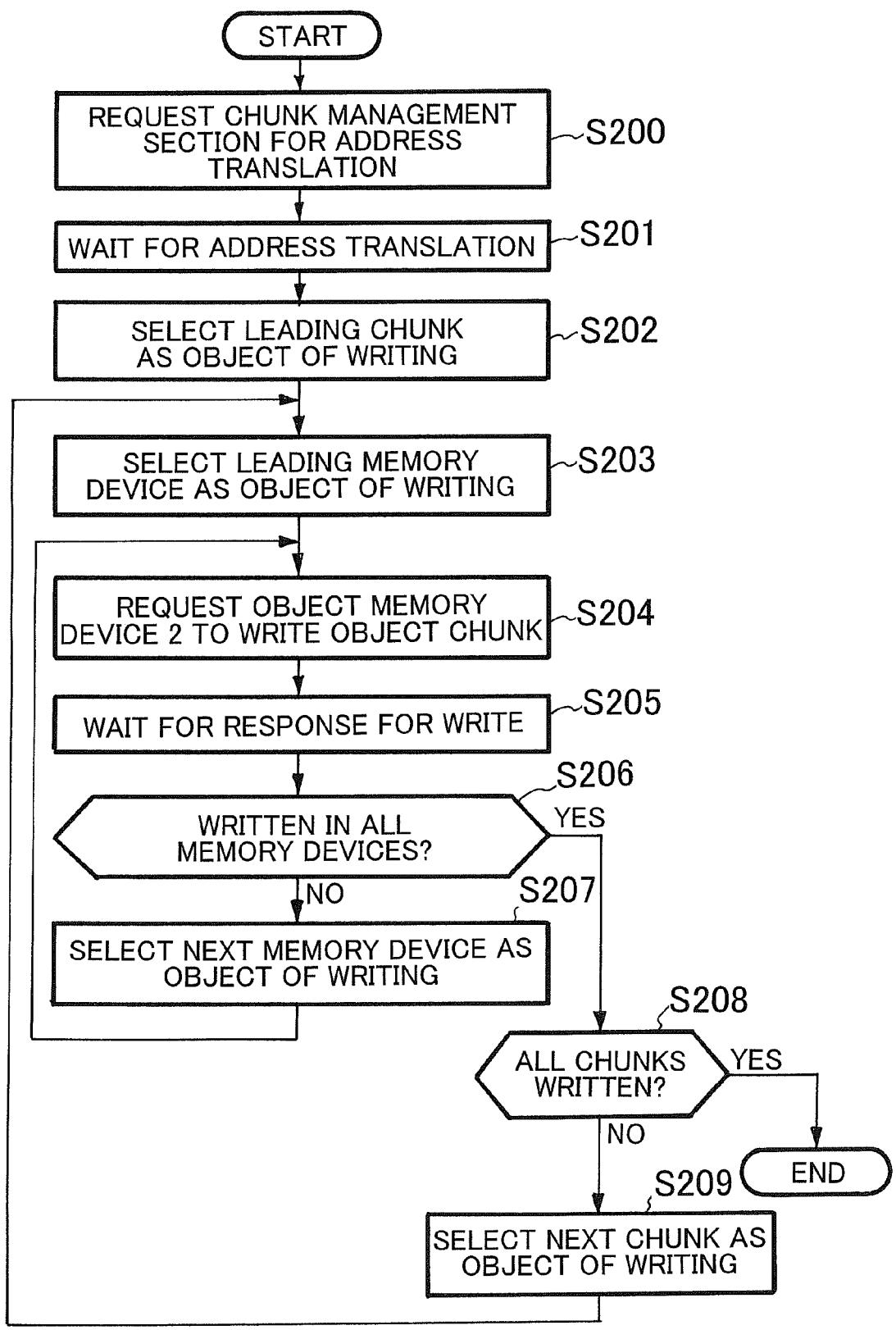
FIG. 9 is a flowchart of an exemplary content write operation.

Now, the content-data writing operation of the host 1 will be described below. FIG. 9 is a flowchart of an exemplary content-data writing operation of the split data management system of this exemplary embodiment. In the split data management system, the host 1 that writes content-data requests the chunk management section 3 to perform an address translation, specifying content-data it wants to write, the write starting position of content-data and the write size, and acquires in response information indicating the storage location of the chunk-data (and its copy-data) of the relevant part of content-data so as to access the memory device according to the information.

When the host 1 actually writes, the host 1 requests the chunk management section 3 to perform an address translation, specifying the content-ID, the offset address indicating the write starting position in content-data, the write size and that the operation is a write operation (Step S200). When the host 1 is connected to the server apparatus having the chunk management section 3 by way of a communication network, the host 1 transmits an address translation request message for the write operation that includes the content-ID, the offset address in content-data and the write size to the server apparatus. Then, the host 1 waits for a response from the chunk management section 3 (Step S201). The chunk management section 3 may assign a content-ID to a novel content-data. If such is the case, the host 1 may specify a content-ID that indicates an unassigned status. The operation of address translation of the chunk management section 3 will be described hereinafter. Note that according to the present invention, the chunk management section 3 determines the assignment locations for same chunk-data which are assigned to respective memory devices different from each other.

Upon receiving a response, the host 1 selects the leading entry of the response as the entry of the object data of writing (Step S202). The format of the response from the chunk management section for the address translation request for a write operation is stored as a single entry for each of chunk-data of object data of writing. Each entry typically includes the write size in the chunk-data, the write starting position in the chunk-data and information indicating the storage location of each of the copy chunk-data and reflecting the number of copies of the chunk-data. The information indicating the storage location of each of the copy chunk-data specifically includes the memory device ID of the memory device storing the copy chunk-data and the chunk access ID in the memory device. Assume here that the entries are stored in the order of the offset addresses of content-data in a part of the data of the response. Note that, if chunk-data is formed by concatenating a plurality of chunk-data, each of the plurality of chunk-data before they are concatenated may be used as an entry.

FIG. 10 is a schematic illustration of an exemplary response format that can be used for an address translation request for a write. In the instance illustrated in FIG. 10, each of the chunk-data of object data of writing is used as an entry and the write size in the chunk-data, the write starting position in the chunk-data, the number of copies of the chunk and information on the assignment locations of the copy chunk-data including the memory device ID of each of the memory devices storing the copy chunk-data and the access information (chunk access ID) in each of the memory devices are stored there. In the instance illustrated in FIG. 10, entry 1 is processed by the host 1 as the entry of the object data of writing. When a chunk access ID that is common to all the memory devices is defined, a chunk access ID is stored for an entry. When a plurality of same copy chunk-data have respective different write starting positions in the chunk-data that are different from each other (for example, when chunks are concatenated in memory devices), the write starting position (offset address in the chunk) in each of the copy chunk-data may be stored.

Then, the host 1 selects the memory device 2 identified by the memory device ID shown at the top as the object memory device for writing for the write location of a copy chunk (Step S203). In the following, the chunk-data to be written in an object memory device for writing is referred to as object copy chunk-data.

As the host 1 identifies the object memory device for writing, the host 1 requests the object memory device for writing to write, specifying the write size in the object entry for writing, the offset address in the chunk-data and the chunk access ID for the object copy chunk-data, along with the data to be written as the object copy chunk-data (Step S204). In this instance, since the entries are stored in the order of the offset addresses of content-data, the host 1 may sequentially specify the data of the write size in the chunk-data for each entry as data to be written from the write starting position in content-data. Then, the host 1 waits for a response from the memory device 2 (Step S205).

Upon receiving a response from the memory device 2, the host 1 determines if the write operation is completed for all the memory devices that are storage locations of the copy chunk-data in the object entry for writing or not. The host 1 moves to Step S208 when the write operation is completed for all the memory devices, whereas it moves to Step S207 when the write operation is not completed for all the memory devices (Step S206). In Step S207, the host 1 selects the memory device 2 identified by the next memory device ID as the object memory device for writing, or the storage location of a copy chunk-data, and then moves to Step S204.

In Step S208, the host 1 determines if the write operation is completed for all the entries included in the response for the address translation request from the chunk management section 3 or not. The host 1 ends the process when the write operation is completed, whereas it moves to Step S209 when the write operation is not completed. In Step S209, the host 1 selects the next entry as the object entry for writing in order to execute the write process for the entries for which a write operation is not performed yet and then moves to Step S203. In the instance of FIG. 10, after completing the write process for all the copy chunk-data indicated by entry 1, entry 2 is selected as object chunk-data for writing and a write process is executed for all the copy chunk-data indicated by entry 2. In this way, the write operation ends when a write process is executed for all the copy chunk-data indicated by entry n.

Thus, the same chunk-data are written in a plurality of memory devices to make data redundant and improve the availability and the security of data. For a write operation, the chunk-data may alternatively be processed for parallel writing without waiting for a response in order to reduce the processing time. Since memory devices can be accessed in parallel, the host 1 can access memory devices in parallel without being particularly conscious about it so that the processing time can be reduced with ease. Additionally, since the assignment locations are determined so as to store the same chunk-data in different memory devices as will be shown in the description of assignment locations determining operation that is given hereinafter, the memory devices to be accessed for a read operation are distributed as a result of writing the chunk-data in the memory devices according to the assignment locations so that the accessibility (throughput and response time) can be improved for a read operation.

While an entry is provided for each chunk-data of content-data so as to store information on the storage locations of the copy chunk-data of the chunk-data in the above-described response format, the present invention is by no means limited thereto and an entry may alternatively be provided for a plurality of chunk-data and store information on the storage locations and information indicating the positions of the copy chunk-data thereof in content-data. If such is the case, the host 1 may simply execute a write process for the plurality of chunk-data indicated by each entry in a sequential manner.

The process of accessing a memory device for chunk-data is a general accessing process such as a process of accessing a block device, a process of accessing a file of a NAS or a process of accessing an object of an OSD. For example, when the memory devices are realized by block devices, a memory device can be accessed by specifying the starting offset address that corresponds to chunk-data in the memory device and the size. If the chunk-data is of a fixed length, the starting offset address that corresponds to chunk-data in a memory device can be computationally determined according to the ordinal number of the chunk-data. If the chunk-data is of a variable length, a list of offset addresses and sizes may be defined for each of chunk-data in a block device and the starting offset address and the size can be computationally determined by referring to the list. When accessing a part of chunk-data, the offset address in the chunk-data is added to the offset address in the block device.

When, on the other hand, the memory devices are realized by a file-based memory system such as NAS, a memory device can be accessed by specifying the file that corresponds to chunk-data in the memory device. When accessing a part of chunk-data, the offset address in the chunk-data is added to the offset address in the file to specify the part. When the memory devices are realized by OSDs, a process of reading or writing the object that corresponds to chunk-data in the memory device is executed. When accessing a part of chunk-data, a read process or a write process specifying an offset address in the chunk-data is executed on the LBA in the object. When no object chunk-data exists at the time of a write operation in a NAS or an OSD, a process of preparing a file or an object, whichever appropriate, is executed simultaneously.

Now, the address translation process of the chunk management section 3 will be described below. As described above, an address translation process is requested by specifying a content-ID, the read/write starting position in content-data and the read/write size.

FIG. 11 is an exemplary process flowchart of an address translation process at the chunk management section 3. Referring to FIG. 11, the chunk management section 3 firstly checks if a write or a read is specified (Step S301) and, executes an address translation process for the write when a write is specified (Step S302), whereas the chunk management section 3 executes an address translation process for the read when a read is specified (Step S303) before the chunk management section 3 returns a response (Step S304) and ends the process.

FIG. 12 is a flowchart of an exemplary process flow of an address translation process for a read. Referring to FIG. 12, the chunk management section 3 firstly reads the content-ID specified as object of address translation and the associated split management information (Step S401). More specifically, the chunk management section 3 typically retrieves the specified content-ID and the associated split management information from the chunk management DB 7. Then, the chunk management section 3 moves to Step S404 when the specified content-ID and the associated split management information are found in the chunk management DB 7, whereas the chunk management section 3 moves to Step S403 when they are not found in the chunk management DB 7 (Step S402).

In Step S403, the chunk management section 3 sets a value that indicates that the chunk-data is unassigned as a response entry and ends the process.

In Step S404, the chunk management section 3 splits the object region of address translation into chunk-data on the basis of the read starting position and the read size that are specified and the offset address and the chunk size of each chunk-data in content-data identified by the split management information the chunk management section 3 reads in Step S401. For example, the chunk management section 3 identifies the offset address and the size of each chunk-data on the basis of the group of pieces of chunk reference information of chunk-data contained in the split management information it reads. Then, the chunk management section 3 identifies the range of chunk-data that corresponds to the data, or the object of address translation, with use of the chunk content-ID by computationally determining the chunk-data in content-data that correspond to the data specified as object of a read on the basis of the read starting position and the size that are specified and the offset address and the chunk size of each chunk-data that are identified in content-data. For instance, the range of chunk-data that are the object of translation can be identified by computationally determining the sequentially arranged chunk-data from an ordinal-numbered chunk-data to another ordinal-numbered chunk-data that form the object data for the read as viewed in the order of offset addresses in content-data.

When the chunk-data are of a fixed length, the ordinal number of the leading chunk-data and that of the tail-end chunk-data (0 reference) are determined by means of the respective formulas shown below to identify the range of chunk-data that are the object of translation:

$$e = a/c \text{ (with omission of fraction)} \qquad \text{formula (2): and}$$

$$f = (a+s)/c \text{ (with omission of fraction)} \qquad \text{formula (3),}$$

where a is the specified read starting position, s is the specified read size, c is the chunk size, the leading chunk-data is the e-th chunk-data and the tail end chunk-data is the f-th chunk-data.

The read starting position g in the leading chunk-data that is the e-th chunk-data and the read ending position h in the tail end chunk-data that is the f-th chunk-data are determined by the respectively formulas shown below:

$$g = a - c(e-1) \qquad \text{formula (4); and}$$

$$h = (a+s) - c(f-1) \qquad \text{formula (5).}$$

When the chunk size is of a variable length and the chunk size of the j-th chunk-data is cj, the ordinal number of the leading chunk-data is determined by e that satisfies the formula (6) shown below and the ordinal number of the tail end chunk-data is determined by f that satisfies the formula (7) shown below:

$$\sum_{j=0}^{e} c_j - c_e \le a < \sum_{j=0}^{e} c_j; \qquad \text{formula (6)}$$

and $$\sum_{j=0}^{f} c_j - c_f \le a + s < \sum_{j=0}^{f} c_j. \qquad \text{formula (7)}$$

The read starting position g in the leading chunk-data that is the e-th chunk-data and the read ending position h in the tail end chunk-data that is the f-th chunk-data are determined by the respective formulas (8) and (9) shown below:

$$g = a - \sum_{j=0}^{e} c_j - c_e; \qquad \text{formula (8)}$$

and $$h = a + s - \sum_{j=0}^{f} c_j - c_f. \qquad \text{formula (9)}$$

As the chunk management section 3 identified the range of chunk-data that are the object of translation, the chunk management section 3 sets the leading chunk-data as object chunk-data and also the entry for the object chunk-data as leading entry in the response (Step S405). Then, the chunk management section 3 reads the copying management information of the object chunk-data (Step S406). For example, the chunk management section 3 may retrieve the copying management information associated with the chunk content-ID of the object chunk-data from the chunk management DB 7 and reads the information. Then, the chunk management section 3 moves to Step S409 when a chunk content-ID is assigned to the object chunk-data in the copying management information and copy chunk-data of the object chunk-data (chunk-data same as the object chunk-data in memory devices) are assigned to memory devices, whereas the chunk management section 3 moves to Step S408 when they are not assigned (Step S407). The chunk management section 3 typically confirms that at least one or more memory device IDs and one or more chunk access IDs are assigned to the chunk content-ID of the object chunk-data in the copying management information the section 3 acquires.

In Step S408, the chunk management section 3 sets information indicating that the object chunk-data is unassigned as an entry in the response on the object chunk-data and then moves to Step S412.

In Step S409, the chunk management section 3 refers to the assignment location information of the object chunk-data included in the copying management information. Then, the chunk management section 3 determines the memory device to be accessed by the host 1 according to the assignment location information (Step S410).

The memory device to be accessed may be determined typically by means of a random number. For example, the chunk management section 3 may generate a random number in a predetermined manner and the memory device to be accessed may be determined according to the remainder produced by dividing the random number by the number of storage locations of chunk-data (the number of copy chunk-data). Alternatively, the memory device to be accessed may be determined by round robin of sequentially using the memory devices that store copy chunk-data. Still alternatively, the memory device whose load is current smallest among the memory devices that store copy chunk-data may be determined as the memory device to be accessed. The load of each memory device may be determined after the chunk management section 3 or the control unit of each memory device typically detects the number of I/Os of the memory device per unit time, the quantity of data transferred to and from the memory device or the ratio of utilization of the CPU.

As the memory device to be accessed is determined, the chunk management section 3 sets information indicating the memory device to be accessed as entry in the response (Step S411). For instance, the chunk management section 3 sets the memory device ID of the memory device to be accessed and, if necessary, access information (chunk access ID) in the memory device as entry in the response for the object chunk-data.

Then, in Step S412, the chunk management section 3 sets the read starting position in the chunk-data (the offset address in the chunk-data) and the read size as entry in the response for the object chunk-data. Note that this operation is also performed when the object chunk-data is unassigned.

The offset address in the chunk-data and the read size can be determined typically by the chunk size c (or cj) determined when detecting the range of chunk-data that are the object of translation, the read starting position g of the leading chunk-data and the read ending position h of the tail end chunk-data, which are described earlier.

More specifically, when the object chunk-data is the leading chunk-data, the offset address in the chunk-data is g and the read size is c−g, where c is the chunk size of the object chunk-data. When the object chunk-data is the tail end chunk-data, the offset address in the chunk-data is 0 and the read size is h. When the object is chunk-data other than the leading chunk-data and the tail end chunk-data, the offset address in the chunk-data is 0 and the read size is c. When the leading chunk-data=tail end chunk-data (e=f), the offset address in the chunk-data is g and the read size is h−g.

When a plurality of chunk-data is concatenated to form a single chunk-data and each of the chunk-data is handled as an entry before the concatenation, it is necessary to consider the position of the object chunk-data in the concatenated chunk-data for the offset address in each of the copy chunk-data.

As the operation of address translation (setting an entry) ends for the object chunk-data, the chunk management section 3 ends the process when there is no chunk-data for which address translation is not performed yet within the range of chunk-data that are the object of translation but moves to Step S414 when there is still such chunk-data (Step S413). In Step S414, the chunk management section 3 sets the next chunk-data as object chunk-data and moves to Step S406.

The operation of acquiring the chunk size in Step S401 may be omitted when the chunk size is predefined for the system. If the chunk size is variable and different from content-data to another, the chunk size included in the split management information of content-data in question is referred to. More specifically, the chunk size included in the chunk reference information of each chunk-data is referred to.

In this example, when all the object data are unassigned, they are handled as a single chunk-data and an entry indicating that they are unassigned is put in the response to be returned.

As described above, the load of a read can be distributed even when a same chunk-data is read by a plurality of hosts because same chunk-data are stored in a plurality of memory devices and hence the memory devices to be accessed can be distributed.

While the chunk management section 3 determines the memory device to be accessed in the above description of the example, it may alternatively be so arranged that the chunk management section 3 puts a group of pieces of information indicating the storage locations of copy chunk-data as an entry and sends the entry to the host 1 so that the host 1 can determine the memory device to be accessed. The host 1 can determine the memory device to be accessed typically by using a random number or a predetermined value to select a memory device from the plurality of memory devices storing the copy chunk-data.

For example, the chunk management section 3 does not determine the memory device to be accessed in Step S410 and sets all the assignment locations of the object chunk-data indicated in the copying management information of the object chunk-data as entry in the response for the object chunk-data. FIGS. 13 and 14 illustrate exemplary response formats that can be used when the host 1 determines the memory device to be accessed. For example, as shown in FIG. 13, the chunk management section 3 may use an entry for a single object chunk-data to store the read starting position in the chunk-data (offset address in the chunk-data), the read size, the number of copies and information on all the assignment locations including the memory device IDs and the chunk access IDs of the copy chunk-data.

FIG. 14 shows an exemplary response format that can be used when the chunk access ID is common to all the memory devices storing the same copy chunk-data. In the instance of FIG. 14, an entry is used for a single object chunk-data to store the read starting position in the chunk-data (offset address in the chunk-data), the read size, the number of copies, the common chunk access ID assigned to all the copy chunk-data of the object chunk-data and the memory device IDs of the copy chunk-data. When the read starting position in the memory device differs from copy chunk-data to copy chunk-data among the same copy chunk-data (e.g., when chunk-data are concatenated in memory devices), the read starting position in the chunk-data (the offset address in the chunk-data) in the memory device is stored for each of the copy chunk-data.

Before requesting a memory device 2 to read in Step S104, the host 1 determines the memory device to be accessed by taking out a memory device ID from the plurality of memory device IDs shown in the object entry for reading as information on all the assignment locations. The host 1 may use a random number or a numeral provided by the host 1.

Figure 15:
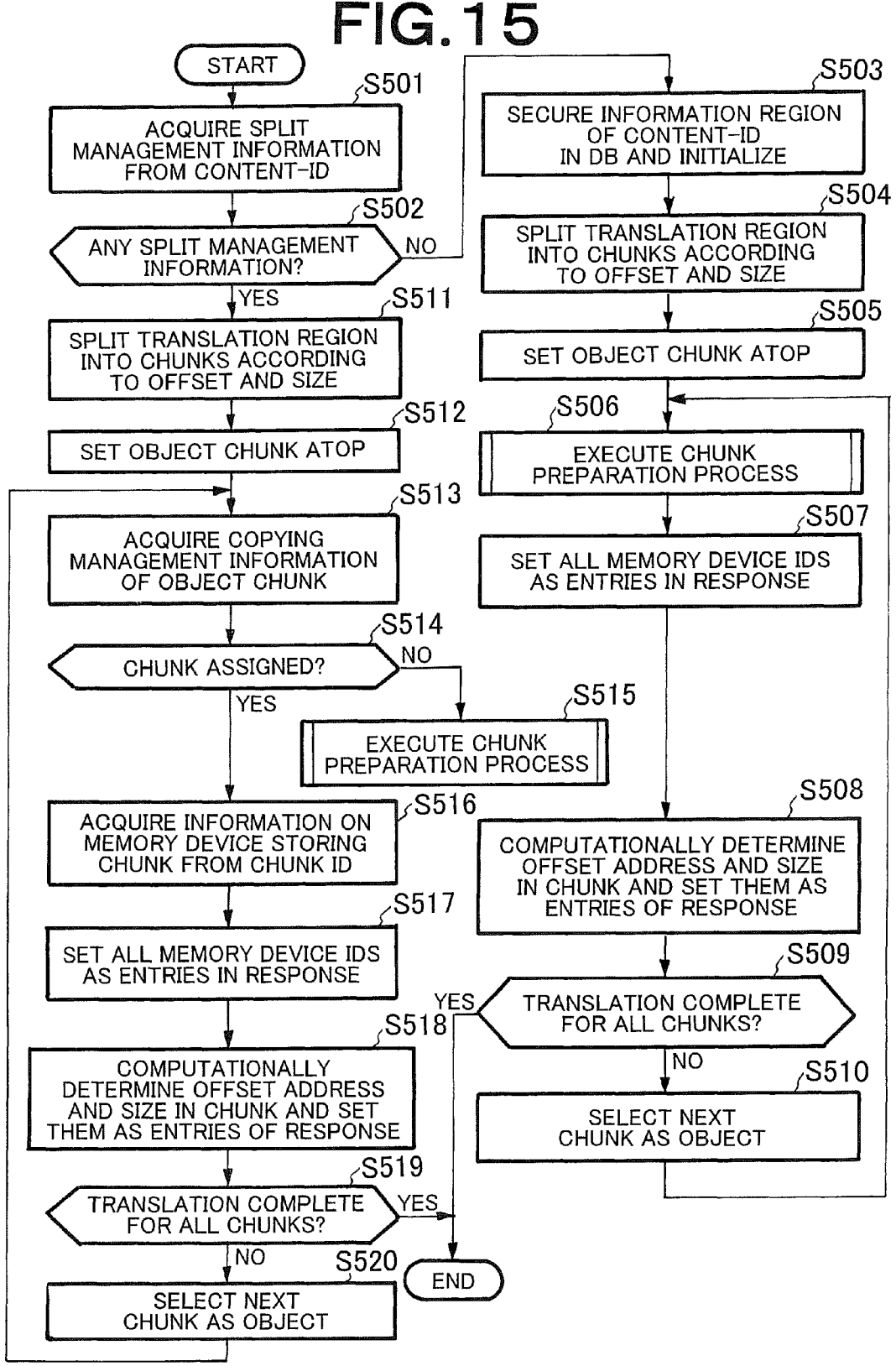
FIG. 15 is an exemplary process flowchart of an address translation process for a write.

FIG. 15 is an exemplary process flowchart of an address translation process for a write. Referring to FIG. 15, the chunk management section 3 firstly reads the split management information associated with the content-ID specified as object of address translation (Step S501). For example, the chunk management section 3 may retrieve and read the split management information associated with the specified content-ID from the chunk management DB 7. Then, the chunk management section 3 moves to Step S511 when the split management information associated with the content-ID is found in the chunk management DB 7, whereas the chunk management section 3 moves to Step S503 when the split management information is not found in the chunk management DB 7 (Step S502). When a content-ID that indicates an unassigned status is specified, the chunk management section 3 may assign a new content-ID before the section 3 moves to Step S503.

In Step S503, the chunk management section 3 secures a region in the chunk management DB 7 for storing the split management information associated with the content-ID and initializes the split management information. The chunk management section 3 typically initializes the split management information by determining the chunk size, generating chunk reference information of each chunk-data according to the number by which the chunk-data is divided and that is determined as a function of the determined chunk size and registering the chunk reference information of each chunk-data as split management information. The chunk size may be a defined value of the system or a value selected for each content-data or for each chunk-data in each content-data. Alternatively, the chunk-data may be divided for each write so as to make the chunk size variable. The offset address of each chunk-data that is computationally determined according to the chunk size may be registered in the chunk reference information of the chunk-data. It is sufficient for the chunk content-ID of each chunk-data to be registered by the time when the copying management information of the chunk-data is prepared and information indicating an unassigned status may be registered at this time or the chunk-data may be brought into an assigned status and registered at this time.

Then, the chunk management section 3 splits the region to be used for address translation for chunk-data on the basis of the write starting position and the write size that are specified, the chunk size determined at the time of initialization in Step S503 and the chunk reference information (Step S504). More specifically, the chunk management section 3 identifies the range of chunk-data that are the object of address translation with use of the chunk content-ID by computationally determining the chunk-data in content-data that correspond to the data specified as object of a write on the basis of the write starting position and the write size that are specified and the offset address and the chunk size of each chunk-data in content-data.

As the chunk management section 3 identifies the range of chunk-data that are the object of address translation, the chunk management section 3 selects the leading chunk-data as object chunk-data and sets the entry of the object chunk-data as the leading entry in the response (Step S505). Then, the chunk management section 3 executes a chunk preparation process of assigning the copy chunk-data of the object chunk-data (the chunk-data same as the object chunk-data that are stored in memory devices) to memory devices (Step S506). The chunk preparation process will be described in greater detail hereinafter.

As the chunk preparation process ends, the chunk management section 3 sets information on the assignment location of the object chunk-data as an entry in the response (Step S507). The chunk management section 3 typically reads the copying management information associated with the chunk content-ID of the object chunk-data that is prepared in the chunk management DB 7 as a result of the chunk preparation process and sets the plurality of memory device IDs of a plurality of memory devices shown as assignment locations in the copying management information and the access information (chunk access IDs) as an entry in the response. Additionally, the chunk management section 3 sets the write starting position (the offset address in the chunk-data) in the object chunk-data and the write size as an entry in the response for the object chunk-data (Step S508). Note that the method to be used for computationally determining the offset address in the chunk-data and the write size is same as the method to be used for computationally determining the offset address in the chunk-data and the read size in an address translation process for a read.

As the address translation process (setting entries) ends for the object chunk-data, the chunk management section 3 ends the entire process when there is not any unprocessed chunk-data in the range of chunk-data that are the object of translation but moves to Step S510 when there is still an unprocessed chunk-data (Step S509). In Step S510, the chunk management section 3 sets the next unprocessed chunk-data as object chunk-data and moves to Step S506.

When there is any split management information associated with the specified content-ID (Yes in Step S502), the chunk management section 3 splits the region that is the object of address translation into chunk-data on the basis of the specified write starting position, the specified write size and the offset address and the chunk size of each of the chunk-data specified by the split management information the section 3 reads (Step S511). More specifically, the chunk management section 3 identifies the range of chunk-data that are the object of address translation by means of the chunk content-ID, by computationally determining the chunk-data in content-data that correspond to the data specified as object of a write as in Step S504.

As the chunk management section 3 identifies the range of chunk-data that are the object of address translation, the chunk management section 3 sets the leading chunk-data as object chunk-data and also the entry of the object chunk-data as the leading entry in the response (Step S512).

As the object chunk-data is set, the chunk management section 3 firstly reds the copying management information of the object chunk-data (Step S513). The chunk management section 3 moves to Step S516 when a chunk content-ID is assigned to the object chunk-data and memory devices are assigned to the object chunk-data as assignment locations by the copying management information, whereas the chunk management section 3 moves to Step S515 otherwise (Step S514).

In Step S515, the chunk management section 3 executes a chunk preparation process of assigning memory devices as many as the number of copies as assignment locations. The chunk preparation process is similar to that of Step S506. When the chunk preparation process is completed, the chunk management section 3 reads the copying management information of the object chunk-data prepared by the chunk preparation process.

In Step S516, the chunk management section 3 reads the copying management information of the object chunk-data that is registered in the chunk management DB 7. The chunk management section 3 typically retrieves and reads the copying management information associated with the chunk content-ID of the object chunk-data from the chunk management DB 7.

Then, the chunk management section 3 refers to the information on the assignment locations of chunk-data included in the copying management information of the object chunk-data (Step S517) and sets the plurality of memory device IDs of the memory devices indicated as assignment locations and the access information (chunk access ID) as an entry in the response (Step S518). The chunk management section 3 also sets the write starting position in the chunk-data (offset address in the chunk-data) and the write size as an entry in the response (Step S519). Information on the assignment locations may not set as an entry in the response so that the assignment locations may not be written again when memory devices are already assigned as assignment locations of the object chunk-data in the copying management information. However, if such is the case, the write size needs to be set so as to notify the host 1 of the offset address of the next chunk-data.

As the address translation process (setting an entry) ends for the object chunk-data, the chunk management section 3 ends the entire process when there is not any chunk-data in the range of chunk-data for which an address translation process is not executed yet, whereas the chunk management section 3 moves to Step S520 when there is still chunk-data for which an address translation process is not executed yet (Step S519).

In Step S530, the chunk management section sets the next chunk-data as object chunk-data and moves to Step S513.

The method to be used for identifying the range of chunk-data that are the object of translation in Steps S504 and S511 is similar to the method used in the address translation process for a read. The method to be used for computationally determining the offset address in the chunk-data and the write size to be set in Steps S508 and S518 is also similar to the method used in the address translation process for a read.

Figure 16:
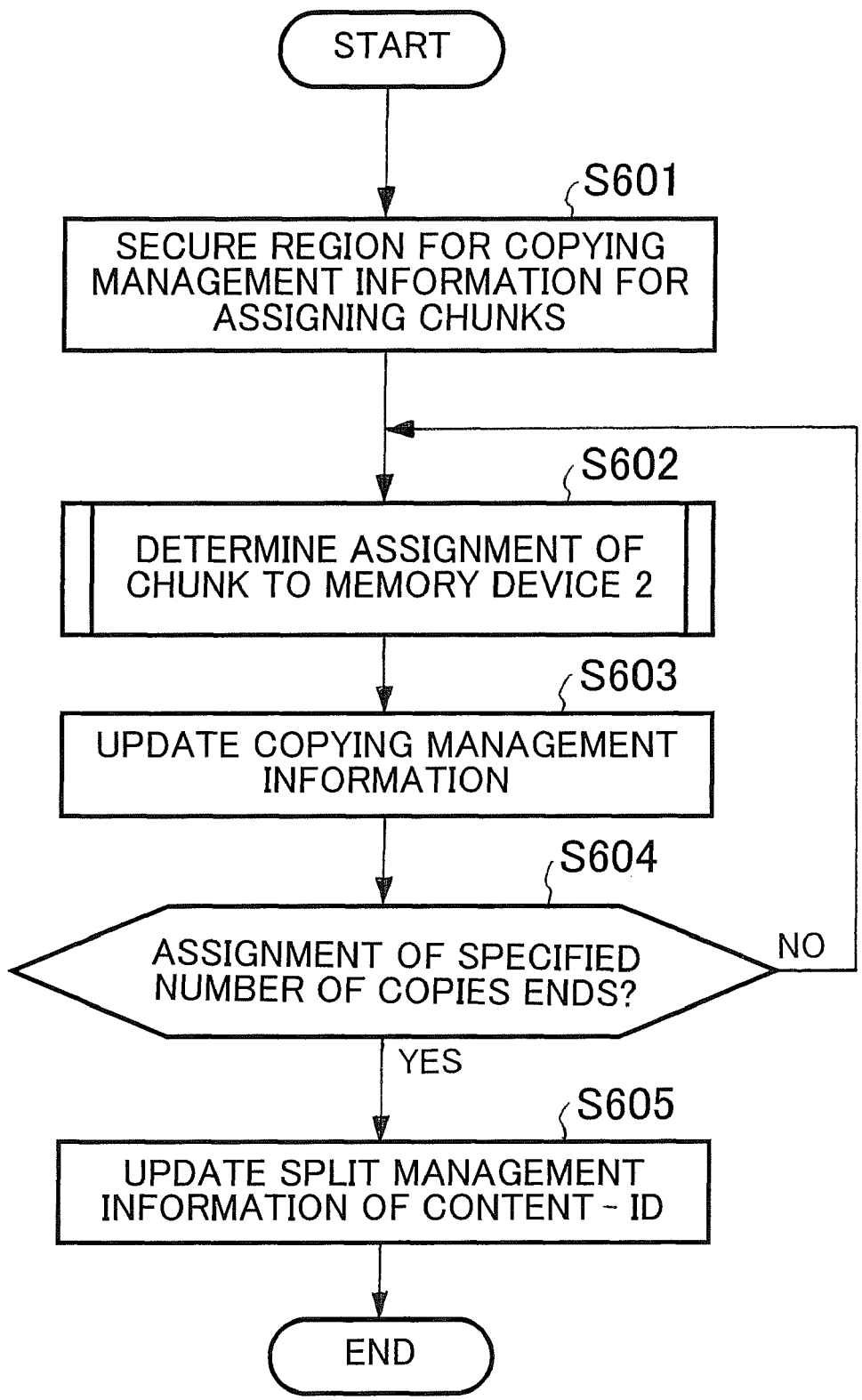
FIG. 16 is an exemplary process flowchart of a chunk preparation process at the chunk management section 3.

Now, the chunk preparation process will be described below. FIG. 16 is an exemplary process flowchart of a chunk preparation process at the chunk management section 3. Referring to FIG. 16, the chunk management section 3 firstly secures a region for storing copying management information on the object chunk-data in the chunk management DB 7 in order to manage the assignment locations of the object chunk-data (Step S601). More specifically, the chunk management section 3 assigns a chunk content-ID to the object chunk-data when no chunk content-ID has been assigned to the object chunk-data, secures a region for storing the copying management information associated with the chunk content-ID and initializes the copying management information. The chunk management section 3 may typically initializes the copying management information by determining the number of copies and registering the number of copies in the copying management information. The number of copies of the chunk-data may be predefined by the system or determined by the number of copies planning section 6. Information on an unassigned status may be registered in the information on the assignment locations of the chunk-data.

Then, the chunk management section 3 determines the memory devices that operate as assignment locations of the object chunk-data (Step S602). The method for determining the assignment locations will be described hereinafter. Then, the chunk management section 3 records the information indicating the determined assignment locations in the copying management information associated with the chunk content-ID of the object chunk-data (Step S603).

The chunk management section 3 moves to Step S605 when assignment locations as many as the number of copies are already determined, whereas the chunk management section 3 moves to Step S602 when so many assignment locations are not determined yet (Step S604). Finally, when the chunk content-ID is assigned to the object chunk-data in Step S601, the chunk management section 3 stores the assigned chunk content-ID in the chunk reference information of the chunk-data of the split management information of content-data including the object chunk-data and ends the process (Step S605). While the host 1 that is notified of the assignment locations actually writes the chunk-data in memory devices in this instance, the copying process section 5 may alternatively write them according to the instruction from the chunk management section 3 as described hereinafter for the number of copy chunk-data adding process.

Now, the process of adding memory devices will be described below. As the chunk management section 3 is notified of the added memory devices, the chunk management section 3 registers at least information on the memory devices in the memory device information in the chunk management DB 7. Thus, the chunk management section 3 makes the added memory devices recognized as candidates of assignment locations in the subsequent chunk preparation processes The chunk management section 3 may reassign chunk-data when memory devices are added.

Now, the process that will be executed when the system fails will be described below. For example, when the failure detecting section 4 detects a memory device that causes a failure to become disabled, the failure detection section 4 notifies the chunk management section 3 of the memory device ID of the memory device. It may be so arranged that the failure detecting section 4 monitors the signal being output and externally notifies that the memory devices are operating normally but detects a disabled status when the transmission of the signal is not confirmed for a predetermined period of time. Alternatively, the failure detecting section 4 may detect a disabled memory device as the memory device ID of the memory device is input to notify that an operation for handling a failure is required in response to an operation of the system manager.

Figure 17:
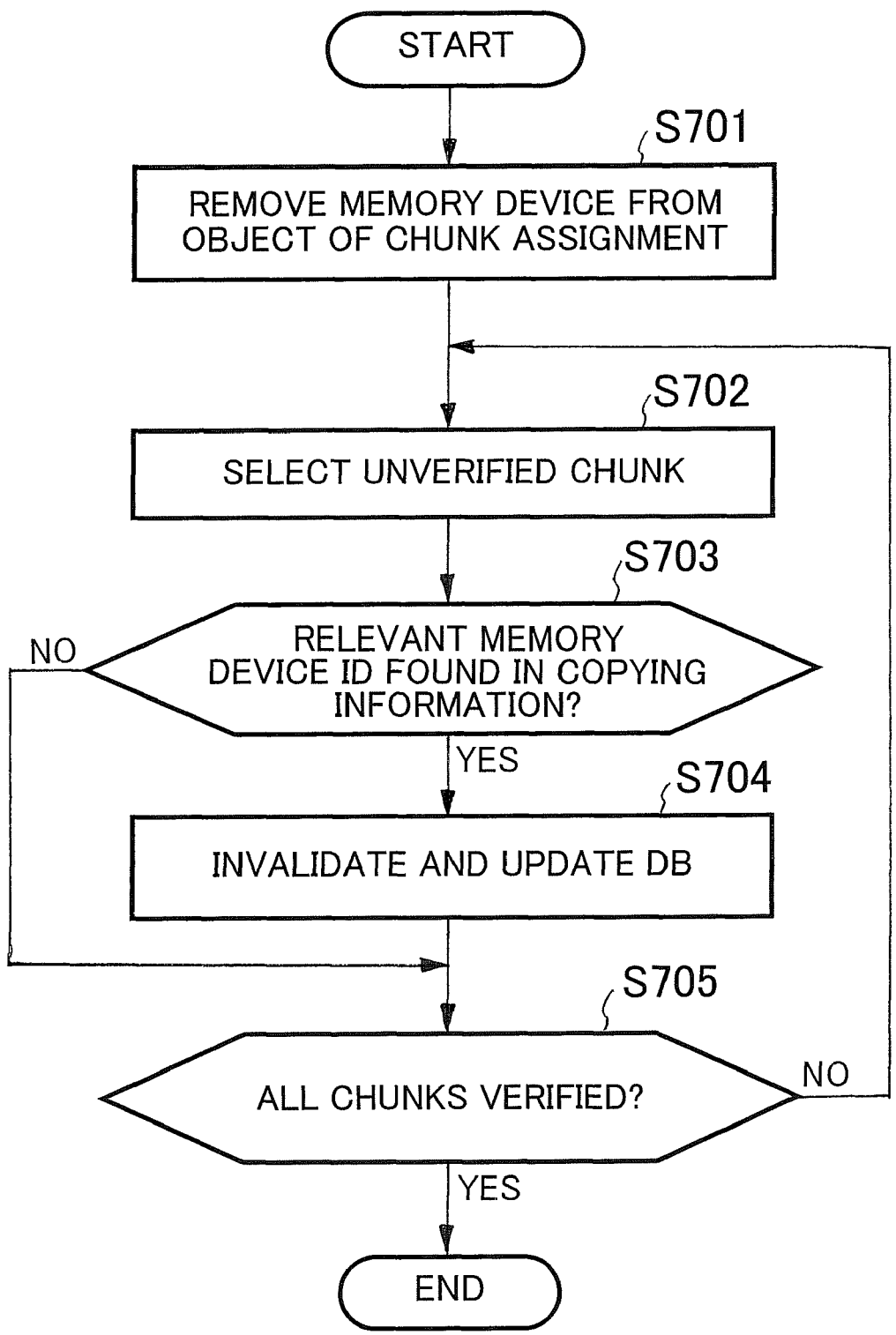
FIG. 17 is an exemplary process flowchart of a failure handling process at the chunk management section 3.

FIG. 17 is an exemplary process flowchart of a failure handling process at the chunk management section 3. Referring to FIG. 17, the chunk management section 3 firstly excludes the memory device identified by the notified memory device ID from the objects of assignment for chunk-data (Step S701). The chunk management section 3 typically changes the operation status of the memory device in the part of the information registered in the chunk management DB 7 that is associated with the memory device ID as memory device information to a halt status.

Then, the chunk management section 3 selects an unverified chunk-data from the chunk content-IDs (the chunk content-IDs recorded in the chunk management DB 7) that is managed by the system and reads the copying management information of the chunk-data (Step S702). Then, the chunk management section 3 checks if the memory device ID excluded from the objects of assignment is registered as assignment location of chunk-data in the copying management information or not and the chunk management section 3 moves to Step S704 when the memory device ID is registered, whereas the section 3 moves to Step S705 when the memory device ID is not registered (Step S703).

In Step S704, the chunk management section 3 deletes the device ID registered as assignment location of chunk-data in the copying management information. For example, the chunk management section 3 changes the device ID excluded from the objects of assignment that is shown in the assignment location information of chunk-data in the copying management information the section 3 reads to information indicating an unassigned status and records the changed copying management information in the chunk management DB 7. In Step S705, the chunk management section 3 ends the process when all the chunk content-IDs recorded in the chunk management DB 7 are verified, whereas the chunk management section 3 moves to Step S702 when all the chunk content-IDs are not verified.

In this way, the memory device that is disabled due to a failure or the like is deleted from the copying management information in the chunk management DB 7 by the chunk management section 3. Therefore, the disabled memory device is not selected as memory device to be accessed in any subsequent address translation process for a read. The host 1 will not access the disabled memory device. Additionally, information indicating that the memory device is in a halt status is registered in the memory device information in the chunk management DB 7 so that the disabled memory device is excluded from the memory devices that are candidates of assignment locations in the chunk preparation process and hence no disabled memory device will be selected as assignment location. Thus, the security and the availability of data are improved with the above-described arrangement.

The chunk management section 3 may execute a process for maintaining the number of copies as part of the failure handling process. Such a process of maintaining the number of copies may be automatically executed when the time defined by the system has elapsed since a failure handling operation or when the load falls below the level defined by the system. It is also possible to execute a process of maintaining the number of copies not as part of the failure handling process but at the time defined by the system such as the time when memory devices 2 are added or when an instruction is given by the user.

Figure 18:
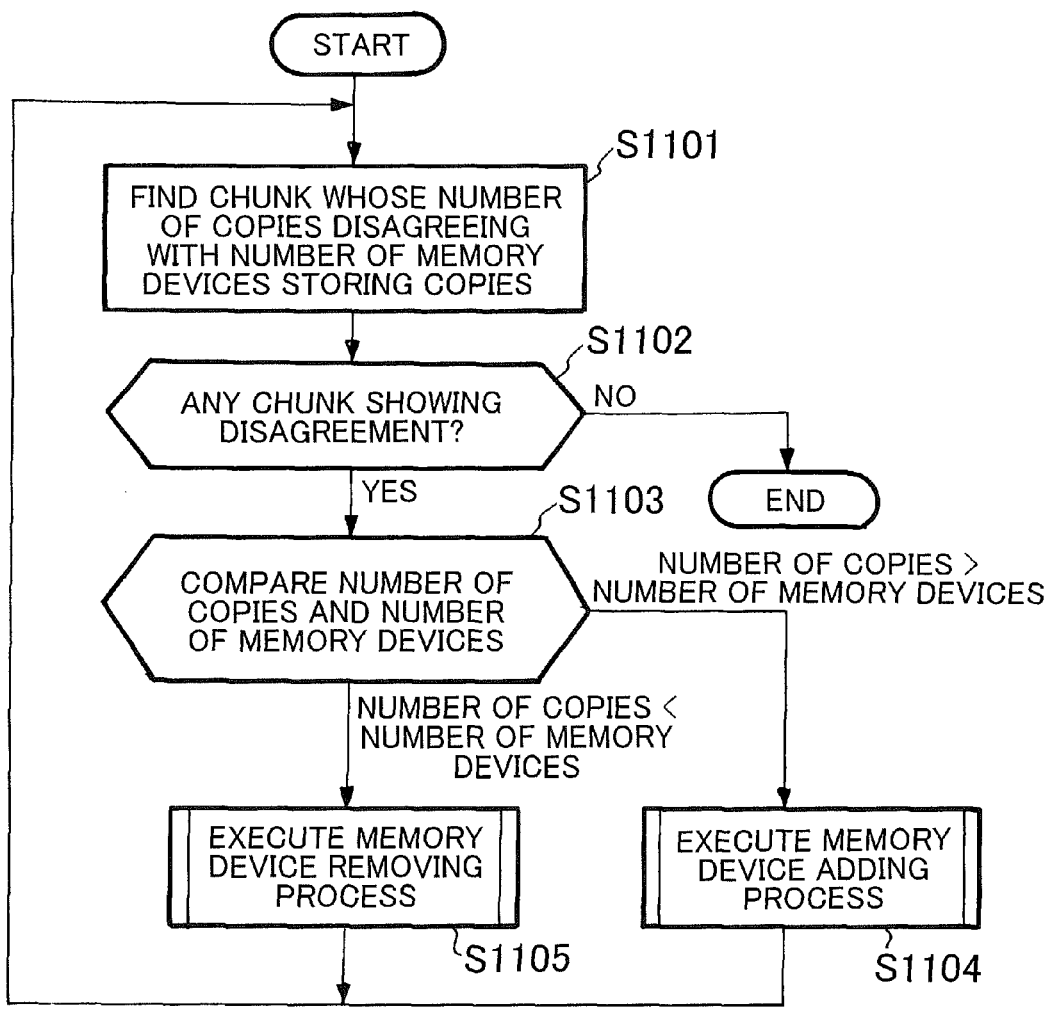
FIG. 18 is a process flowchart of a process for maintaining the number of copies.

FIG. 18 is a flowchart of a process for maintaining the number of copies. Referring to FIG. 18, the chunk management section 3 firstly retrieves, from copying management information of chunk-data recorded in the chunk management DB 7, any copying management information of chunk-data that the number of copies of chunk-data does not agree with the number of copy chunk-data that are actually assigned to memory devices (Step S1101). The number of copies of chunk-data can be recognized by referring to the value defined by the system or the value registered in the copying management information. The number of copy chunk-data that are actually assigned to memory devices can be recognized by referring to the number of memory device IDs registered as at locations of the chunk-data in the copying management information. The chunk management section 3 moves to Step S1103 when such a disagreement is found, whereas the chunk management section 3 ends the process when such a disagreement is not detected (Step S1102).

In Step S1103, the chunk management section 3 compares the number of copies of the chunk-data and the number of copy chunk-data that are actually assigned to memory devices on the basis of the retrieved copying management information and the section 3 moves to Step S1105 when the number of copies of the chunk-data is larger than the number of copy chunk-data that are actually assigned to memory devices, whereas the section 3 moves to Step S1104 when conversely the number of copies of the chunk-data is smaller than the number of copy chunk-data that are actually assigned to memory devices.

In Step S1104, the chunk management section 3 executes a copy chunk-data adding process to add chunk-data by the number equal to the difference between the number of copies of the chunk-data and the number of copy chunk-data that are actually assigned to memory devices. While the copy chunk-data adding process will be described hereinafter, it is preferable that the chunk management section 3 only determines the memory device from which copies are formed and the memory devices to which copies are assigned and makes the copying process section 5 actually execute the copying process, using the memory devices, so that the load of the chunk management section 3 executing ordinary chunk access processes may not be increased by processes for recovering from failures and those for relocations.

In Step S1105, the chunk management section 3 executes copy chunk-data deleting process to delete chunk-data by the number equal to the difference between the number of copies of the chunk-data and the number of copy chunk-data that are actually assigned to memory devices. Again, it is preferable that the chunk management section 3 only determines the memory devices from which the copy chunk-data are to be deleted and makes the copying process section 5 actually execute the process of deleting the copy chunk-data from the memory devices.

As the copy chunk adding process or the copy chunk deleting process is completed for the chunk-data, the chunk management section 3 moves to Step S1101 to retrieve the next object chunk-data.

The copy chunk adding process or the copy chunk deleting process may be executed for a plurality of chunk-data simultaneously in parallel. The processing time is reduced when different memory devices 2 are used as copy originating memory devices and copy destination memory devices or different memory devices 2 are used as memory devices from which copies are to be deleted. As the process time is reduced, the period during which the number of copies of a chunk and the number of copy chunks that are actually assigned to memory devices differ from each other is reduced. Particularly, the reliability of the system is improved when such a period is reduced because, when some memory devices that are assignment locations become disabled due to a failure and deleted, the degree of redundancy is reduced due to the decreased number of copy chunk-data.

While the copying process section 5 is made to execute only the copy chunk adding process or the copy chunk deleting process in this example, the copying process section 5 may alternatively be made responsible for the entire process of maintaining the number of copies so that the chunk management section 3 may simply determine the copy originating chunk-data and the copy destination chunk-data or the chunk-data from which copies are to be deleted in response to a request from the copying process section 5.

The process of maintaining the number of copies is executed not only for recovering from a failure but also when the number of copies is altered by the number of copies planning section 6. For example, the number of copies planning section 6 may alter the number of copies according to the access situation of each content-data. For instance, the number of copies planning section 6 may computationally determine the number of copies required for each content-data or each chunk-data in content-data and, if the number of copies and the computationally determined number of copies differ from each other for chunk-data, the number of copies planning section 6 may update the number of copies of the chunk-data in the copying management information in the chunk management DB 7 and have the chunk management section 3 execute the process of maintaining the number of copies. Alternatively, when the number of copies planning section 6 does not recognize the object, the number of copies of which is to be altered, as chunk (when content-data is handled as a unit) or when a plurality of chunks in content-data are handled as an object, the number of copies planning section 6 may specify the number of copies that is computationally determined, the content-ID and, if necessary, the range of object chunk-data in content-data and have the chunk management section 3 executes the number of copies alteration process, which will be described hereinafter. The range of object chunk-data may be specified by specifying the offset addresses in content-data and the size.

The timing of computationally determining the number of copies may be when the number of accesses to content-data exceeds or falls below a threshold level defined by the system or when the predicted number of accesses to content-data exceeds or falls below a threshold level defined by the system. Alternatively, the timing of computationally determining the number of copies may be when the unused memory capacity of the memory devices 2-1 through 2-n exceeds or falls below a threshold level defined by the system.

Figure 19:
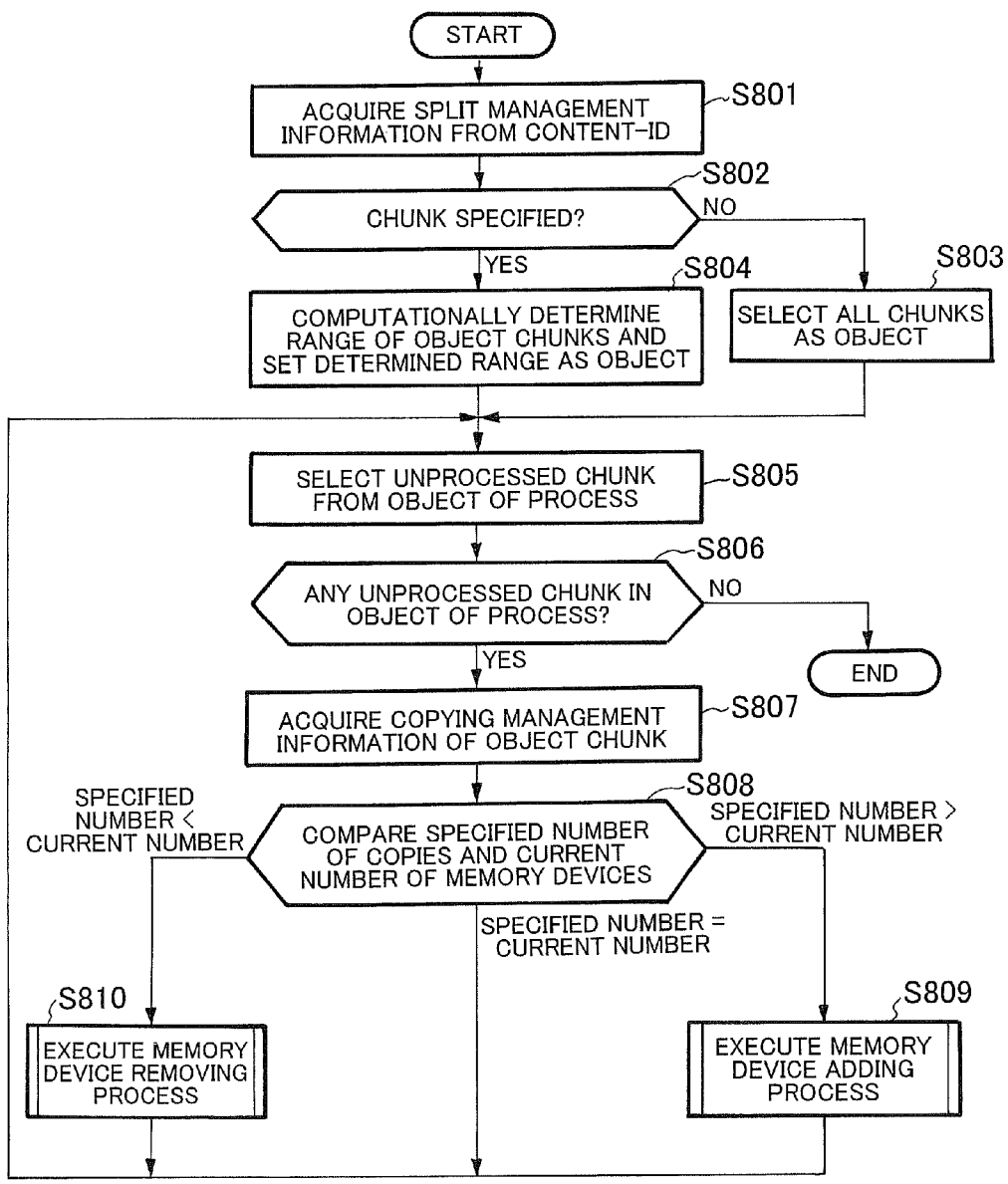
FIG. 19 is a process flowchart of a number of copies alteration process at the chunk management section 3.

FIG. 19 is a process flowchart of a number of copies alteration process at the chunk management section 3. The number of copies alteration process is executed when an instruction for altering the number of copies is issued from the number of copies planning section 6. Referring to FIG. 19, the chunk management section 3 reads the split management information that corresponds to the content-ID specified by the number of copies planning section 6 from the chunk management DB 7 (Step S801). Then, the chunk management section 3 moves to Step S804 when offset addresses and the size are specified for the range of object chunk-data but otherwise the section 3 moves to Step S803 (Step S802).

In Step S803, the chunk management section 3 sets all chunk-data in content-data as object of alternation for the number of copies. In Step S804, on the other hand, the chunk-data management section 3 grasps the range of chunk-data by computations, using the offset addresses and the size that are specified and sets the grasped chunk-data as object of alteration for the number of copies. The method for identifying the range of chunk-data is similar to the one described above in Step S404 of the address translation process for a read.

After identifying the range of chunk-data as object of alteration, the chunk management section 3 selects an unprocessed chunk-data from the chunk-data that are the object of alteration (Step S805). The chunk management section 3 ends the process when there is not any unprocessed chunk-data, whereas the chunk management section 3 moves to Step S807 when there is still an unprocessed chunk-data (Step S806).

In Step S807, the chunk management section 3 reads the copying management information that corresponds to the selected chunk-data from the chunk management DB 7. Then, the chunk management section 3 compares the specified number of copies and the number of copies in the copying management information and moves to Step S805 when the two numbers agree with each other, whereas the chunk management section 3 moves to Step S810 when the specified number of copies is smaller but the section 3 moves to Step S809 when the specified number of copies is larger (Step S808).

In Step S809, the chunk management section 3 executes a copy chunk adding process for the selected chunk-data to add chunk-data by the difference between the specified number of copies and the number of copies in the copying management information. In Step S810, the chunk management section 3 executes a copy chunk deleting process for the selected chunk-data to delete by the difference between the specified number of copies and the number of copies in the copying management information. As the copy chunk adding process or the copy chunk deleting process is completed for the selected chunk-data, the chunk management section 3 moves to Step S805 to select the next chunk-data.

The processing steps from Step S805 may be executed in parallel to reduce the processing time. The processing time is reduced when different memory devices 2 are used as memory devices from which copies are formed and memory devices to which copies are assigned or different memory devices 2 are used as memory devices from which copies are deleted.

Figure 20:
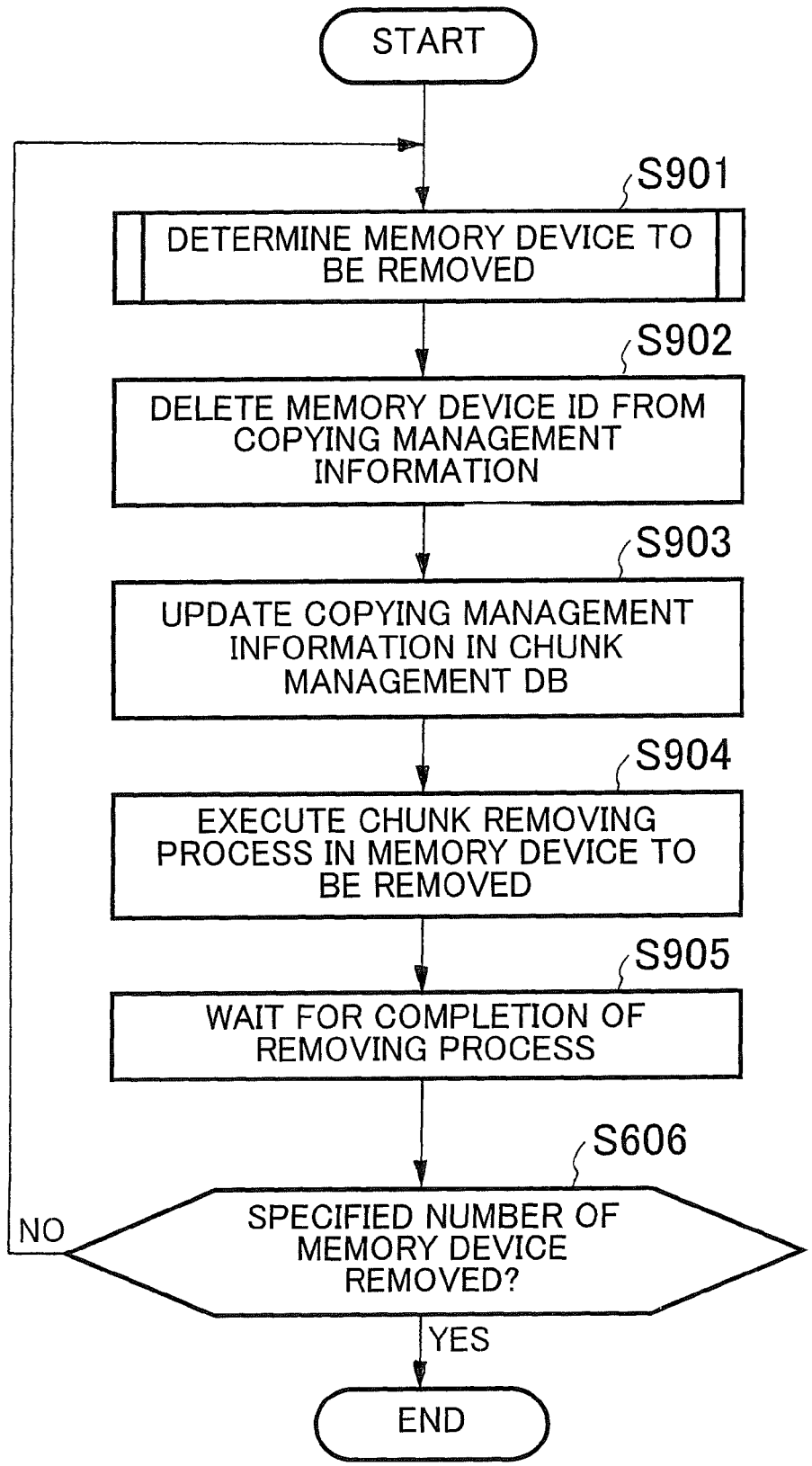
FIG. 20 is an exemplary process flowchart of a process of deleting one or more than one copies of chunk-data at the chunk management section 3.

Now, the copy chunk deleting process will be described below. FIG. 20 is an exemplary flowchart of a process of deleting one or more copies of chunk-data at the chunk management section 3. Assume that, in this example, the chunk content IDs, the current copying management information and the number of copy chunk-data to be deleted are specified for the chunk-data for which the copy chunk deleting process is executed. Referring to FIG. 20, the chunk management section 3 firstly determines the copy chunk-data or chunk-data to be deleted from the chunk-data currently actually assigned to memory devices as copy chunk-data of the object chunk-data that are indicated by the copying management information of the object chunk-data (chunk-data in content-data) (Step S901). Since the copy chunk-data are stored in respective memory devices that are different from each other, the memory devices from which the copy chunk-data are to be deleted are determined in this step.

As the chunk management section 3 determines the memory devices from which the copy chunk-data are to be deleted, the section 3 deletes the memory device IDs of the memory devices from which the copy chunk-data are to be deleted out of the copying management information of the object chunk-data (Step S902). In other words, the memory device IDs of the memory devices from which the copy chunk-data are to be deleted is altered to information indicating an unassigned status out of the memory device IDs indicated as information on the assignment locations of the object chunk-data in the copying management information on the object chunk-data. Then, the chunk management section 3 causes the chunk management DB 7 to reflect the altered copying management information (Step S903).

Then, the chunk management section 3 directs the copying process section 5 to execute a process of deleting the object chunk-data (the copy chunk-data to be deleted) in the memory device that are selected as objects of the deleting process (Step S904). For example, the chunk management section 3 may direct the copying process section 5 to delete the copy chunk-data by specifying the memory device IDs of the memory devices from which the copy chunk-data are to be deleted and the chunk access IDs of the copy chunk-data that are to be actually deleted. Then, the chunk management section 3 waits for a notification of completion of the chunk deleting process from the copying processing section 5 (Step S905).

The chunk management section 3 ends the process when the copy chunk deleting process is completed for the specified number of copy chunk-data, whereas the section 3 moves to Step S901 when the specified number of copy chunk-data are not deleted yet (Step S906).

While the process of deleting chunk-data stored in memory device is executed sequentially in this example, the process may alternatively be executed in parallel for all the memory devices storing the chunk-data to be deleted after determining the copy chunk-data to be deleted for the specified number. The processing time can be reduced by such a parallel execution of the process. Since the process of deleting chunks is executed in different memory devices 2, such a parallel execution of the process gives rise to a good processing efficiency.

While the chunk management section 3 waits for completion of the copy chunk deleting process in Step S905, the section 3 may alternatively proceed with the process without waiting for completion to further reduce the processing time. Since chunk-data are actually deleted from memory devices 2 after updating the chunk management DB 7 in this example, the probability that the host 1 accesses chunk-data while the chunk-data is being subjected to a chunk deleting process can be reduced to improve the security of access from the host 1.

When the chunk deleting process is executed in parallel, the load of the memory devices 2 that are objects of the process can be raised. If such is the case, an upper limit may be provided for the number of chunk-data to be deleted in parallel to suppress the parallel execution of the chunk deleting process beyond the upper limit. With such an arrangement, the processing potential of the memory devices 2 for other processes can be secured and hence the access performance is secured.

Now, the process of deleting chunk-data in a memory device by the copying process section 5 will be described below. A memory device ID and a chunk access ID are specified and the copying process section 5 is directed to delete the object chunk-data in the memory device having the specified memory device ID. Then, the copying process section 5 issues a chunk deleting request to one of the memory devices 2-1 through 2-n having the specified memory device ID to delete the chunk-data showing the specified chunk access ID. The chunk deleting request may be in fact an instruction for deleting data issued to a block device, an instruction for deleting a file issued to a file system or an instruction for deleting an object issued to an OSD.

Figure 21:
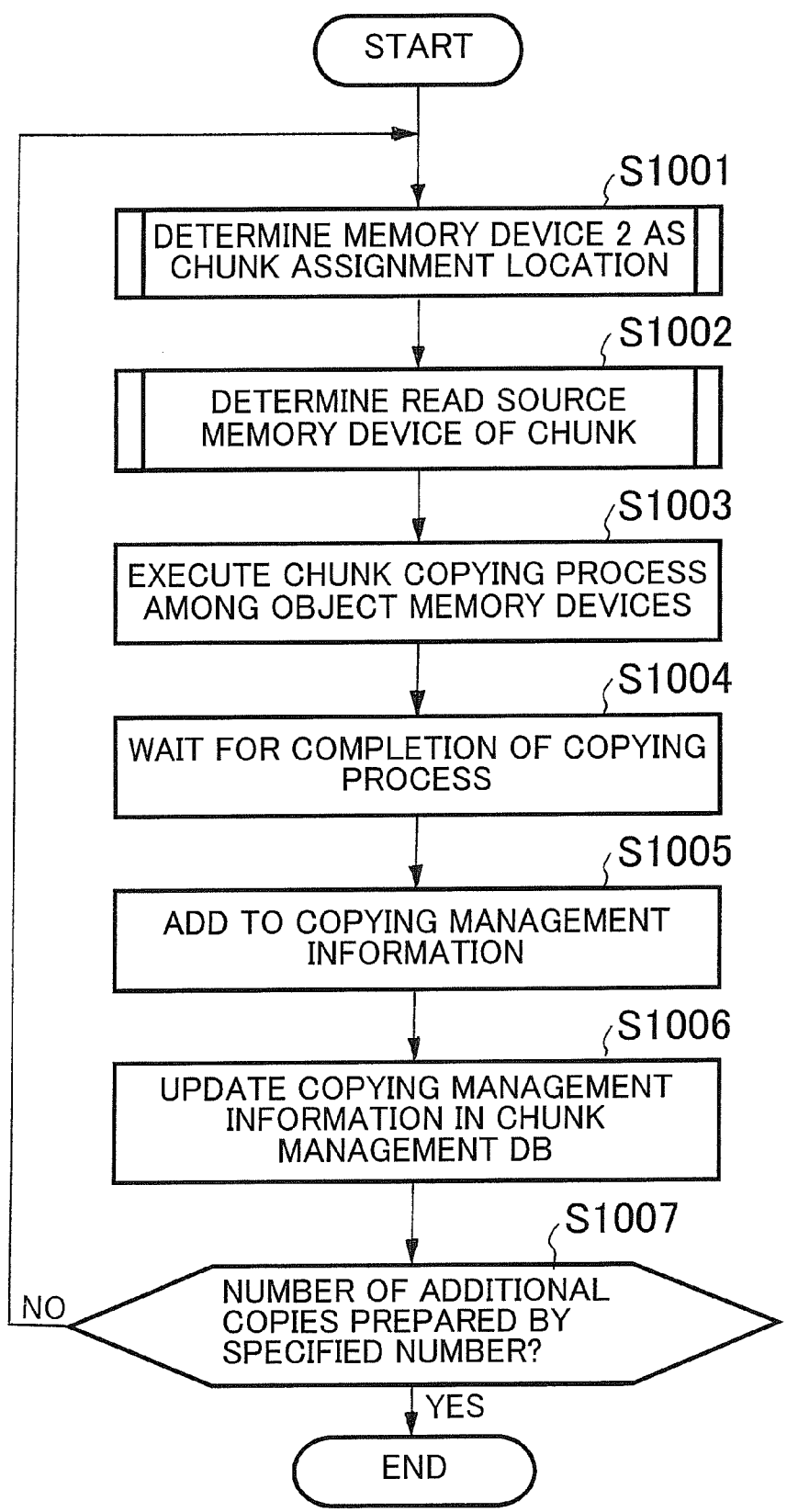
FIG. 21 is an exemplary process flowchart of a process of adding one or more than one copies of chunk-data at the chunk management section 3.

Now, the copy chunk adding process (redundancy raising process) will be described below. FIG. 21 is an exemplary flowchart of a process of adding one or more copy chunk-data at the chunk management section 3. Assume that, in this example, the chunk content-ID, the current copying management information and the number of copy chunk-data to be added are specified for the chunk-data for which the copy chunk adding process is executed. Referring to FIG. 21, the chunk management section 3 firstly determines the new assignment location or locations for the chunk (the chunk in content-data) for which one or more copy chunks are to be added based on the copying management information of the chunk-data of the addition object (Step S1001). In Step S1001, the chunk management section 3 determines the memory devices that are the new assignment locations of the new copy chunk-data by the assignment location determining method that will be described hereinafter. Then, the chunk management section 3 determines the copy originating memory device to produce the data that are to be assigned to the memory devices determined in Step S1001 (Step S1002) More specifically, the chunk management section 3 determines the memory device IDs of the memory devices that are the new assignment locations and the chunk access IDs in the respective memory devices and also determines the memory device ID and the chunk access ID in the memory device having the memory device ID specified as the copy originating memory device respectively in Steps S1001 and S1002.

Then, the chunk management section 3 directs the copying process section 5 to execute a process of copying the object chunk-data among the memory devices (the copy originating memory device and the copy destination memory devices selected for the copy chunks) (Step S1003). For example, the chunk management section 3 may specify the memory device IDs and the chunk access IDs of the new assignment locations and the memory device ID and the chunk access ID of the memory device from which the chunk is to be copied so as to execute a chunk copying process among the object memory devices. When the chunk access IDs of the memory devices that are the new assignment locations are assigned as a result of the copying process, they may not be specified at this stage. Then, upon receiving the notification of completion of the copying process from the copying process section 5 (Step S1004), the chunk management section 3 adds information showing the assignment locations of the added copy chunks (the memory device IDs and the chunk access IDs) to the assignment location information of the object chunk-data in the copying management information (Step S1005). Then, the chunk management section 3 causes the chunk management DB 7 to reflect the altered copying management information (Step S1006).

The chunk management section 3 ends the process when the chunk copying process is completed for the specified number of added copy chunk-data, whereas the section 3 moves to Step S1001 when the specified number of chunk-data are not added yet (Step S1007).

While the process of copying chunk-data from a memory device to other memory devices is executed sequentially in this example, the process may alternatively be executed in parallel for the plurality of memory devices after determining the copy originating memory device and the copy destination memory devices whose number is equal to the number of copies to be added. The processing time can be reduced by such a parallel execution of the process. Since the process of copying chunk-data is executed so as not only to assign copies to different memory devices 2 but also to form copies from different memory devices 2, such a parallel execution of the process gives rise to a good processing efficiency.

Since the chunk management section 3 waits for completion of the chunk copying process in Step S1004 in this example before updating the chunk management DB 7, the probability that the host 1 accesses chunk-data while the chunk-data is being subjected to a chunk copying process can be reduced to improve the security of access from the host 1.

The process of copying chunk-data from a memory device to memory devices of the copying process section 5 will be described below. The copying process section 5 receives the memory device ID of the copy originating memory device, the chunk access ID in the memory device, the memory device IDs of the copy destination memory devices and the chunk access IDs in the memory devices along with an instruction for copying the object chunk among the memory devices. The copying process section 5 issues a read request to the memory device identified by the memory device ID specified as the copy originating memory device for the chunk-data indicated by the chunk access ID of the specified copy originating chunk-data. As the object chunk-data is read, the copying process section 5 issues a write request to the memory device identified by the specified copy originating memory device ID for writing the read data to the chunk-data indicated by the copy destination chunk access IDs. If any of the copy destination memory devices does not have the specified chunk-data, the chunk-data is prepared for the memory device. Chunk-data is prepared in a manner similar to a file prepared by a file system or an object prepared by an OSD.

While the copying process section 5 reads data and then copies the data in this example, chunk-data may be copied directly from the copy originating memory device to the copy destination memory devices without the intervention of the copying process section 5 as in the case of the third party copying feature of storages.

Now, the method of determining assignment locations of chunk-data will be described below. A method of determining assignment locations of chunk-data is used for the chunk assigning process in Step S602 of the chunk preparation process shown in FIG. 16 and in Step S1001 of the copy chunk adding process shown in FIG. 21.

Firstly, a method of determining assignment locations for preventing multiple assignment of a same chunk will be described. FIG. 22 is an exemplary process flowchart of a chunk assignment process at the chunk management section 3, using this method. Assume that the chunk content ID to be used for the assignment and the current copying management information are specified for the chunk assignment process in this example. The number of assignment is 1 for the chunk assignment process. Referring to FIG. 22, the chunk management section 3 lists up all the memory devices that can be used for chunk assignment (Step S1201). The memory devices that can be used for chunk assignment can be listed by preparing a list of assignment candidates, or an assignment candidate list, using the memory device IDs of the memory devices that are currently operating according to the operating conditions in the memory device information registered in the chunk management DB 7.

Then, the memory devices to which copy chunk-data of the object chunk-data is already assigned and shown in the copying management information of the object chunk-data are deleted from the assignment candidate list (Step S1202). Thus, now the memory devices that are currently operating and to which no copy chunk-data of the object chunk-data is assigned are listed up in the assignment candidate list. Finally, a memory device is selected from the assignment candidate list typically by using a random number and the selected memory device is determined as assignment location (Step S1203).

As a result, same chunk-data are assigned to respective memory devices that are different from each other. Thus, if a memory device falls in a failure, the chunk stored in some other memory device can be accessed so that the security and the availability of data are improved. Additionally, the scalability of access to chunk-data is improved because there is a plurality of chunk-data same as chunk-data in content-data (chunk-data with a same chunk content-ID).

While the assignment location is determined by using a random number in Step S1203 in the above description, the assignment location may alternatively be determined in such a way that the system keeps a table showing the number of chunk-data that each memory device stores and the unused data region that each memory device has and the memory device storing the smallest number of chunks or having the largest unused data region is selected as assignment location. When the load condition of each memory device is known, the memory device having the smallest load may be selected as assignment location.

If a situation where all the memory devices are removed from the assignment candidate list in Step S1202 is conceivable, the chunk management section 3 may determine the assignment location so as to maximally equalize all the memory devices. More specifically, before removing a memory device from the assignment candidate list in Step S1202, the number of assigned object chunk-data is registered in the assignment candidate list so that the memory devices except the memory device having the smallest number of assigned object chunks are removed from the list.

Now, a method of determining assignment locations for preventing multiple assignments of continuous chunk-data in content-data will be described below. FIG. 23 is an exemplary process flowchart of a chunk assignment process at the chunk management section 3, using this method. Assume again that the chunk content ID to be used for the assignment and the current copying management information are specified for the chunk assignment process in this example. The number of assignment is 1 for the chunk assignment process. Since Steps S1301 and S1302 in FIG. 23 are same as Steps S1201 and S1202 in FIG. 22, they will not be described any further.

In this example, the chunk management section 3 checks the split management information associated with the chunk content-ID of the object chunk-data to see not more than N chunk-data preceding and succeeding the object chunk-data from and removes the memory devices to which copy chunk-data of the chunk-data is already assigned among the not more than N chunk-data preceding and succeeding the object from the assignment candidate list (Step S1303). Thus, now the memory devices that are currently operating and do not have any copy chunk of the object chunk assigned thereto are listed up in the assignment candidate list out of the not more than N chunk-data preceding and succeeding the object chunk-data. Finally, a memory device is selected from the assignment candidate list and the selected memory device is determined as assignment location (Step S1304). The operation of selecting a memory device from the assignment candidate list is same as that of Step S1203.

As a result, same chunks are assigned to respective memory devices that are not only different from each other but not storing chunk-data that are same as the not more than N chunk-data preceding and succeeding the object chunk-data. Thus, if chunk-data are sequentially accessed, the accesses are distributed among different memory devices. In other words, the throughput of sequentially accesses is improved.

While N in the expression of not more than N may be 1, it is preferable to define a number that can include chunk-data corresponding to the number of chunk-data to be accessed simultaneously by read-ahead when content-data is handled by using a buffer and read-ahead. With such an arrangement, the throughput can be improved and the response time can be reduced for read-ahead accesses.

Now, the method of determining assignment locations for leveling the correlation among memory devices will be described below. This is a method typically for determining assignment locations such that the assignment of chunk-data in a memory device may not agree with the assignment of chunks in any other memory devices. The number of same copy chunk-data that two memory devices share is expressed as share number here. The assignment locations of copy chunk-data are determined so as to uniformize the share numbers of any combinations of memory devices. With this arrangement, the assignment patterns of chunk-data in memory devices are uniformized and the load that arises when a memory device is falls in a failure and becomes disabled and some other memory device is made to operate as substitute is uniformized.

A technique of leveling the correlation among memory devices will be described below. A table storing the sharing degrees of memory devices is prepared in the chunk management DB 7.

The table is operated in a manner as described below. The table shows a two-dimensional arrangement of n×n memory devices and the number of chunk-data shared by any two memory devices (to be referred to simply as sharing member hereinafter) is indicated by arrangement elements having the memory device IDs of the two memory devices as suffix. The table is referred to as arrangement A. The initial values of all the arrangement elements of the arrangement A are made equal to 0. An integer that is not smaller than 0 is assigned to each memory device ID. When the chunk management section 3 assigns a plurality of same chunks to assignment locations at a same time, the share number indicated by the arrangement elements having the combination of memory device IDs of the assignment locations of same chunk-data as suffix is +1. For example, when same chunk-data are assigned respectively to memory devices 2-a. 2-c and 2-k, 1 is added to arrangements A [a] [c], A [c] [a], A [a] [k], A [k] [a], A [c] [k] and A [k] [c].

When the chunk management section 3 deletes chunk-data from a memory device, the share number indicated by the arrangement elements having as suffix the combination of the memory device ID of the memory device that is the assignment location of the chunk and other memory device IDs of the memory devices to which chunk-data same as the former chunk-data is currently assigned is −1. For example, when the chunk-data assigned to memory device 2-k is deleted out of the chunk-data assigned to memory devices 2-a, 2-c and 2-k, 1 is subtracted from arrangements A [a] [k], A [k] [a], A [c] [k] and A [k] [c].

When the chunk management section 3 adds chunk-data to a memory device, the share number indicated by the arrangement elements having as suffix the combination of the memory device ID of the memory device to which the chunk-data is assigned and other memory device IDs of the memory devices to which chunk-data same as the former chunk-data is currently assigned is +1. For example, when chunk-data same as the chunks assigned respectively to memory devices 2-a. 2-c and 2-k is newly assigned to memory device 2-h, 1 is added to arrangements A [a] [h], A [c] [h], A [k] [h], A [h] [a], A [h] [c] and A [h] [k].

When the chunk managing section 3 determines the assignment location of new chunk-data, the section 3 selects the memory device whose correlation with the memory devices to which chunk-data same as the former chunk-data are already respectively assigned is lowest by referring to such a table. More specifically, when the chunk management section 3 determines the assignment of chunk-data same as the chunk-data that are already assigned to memory devices, the section 3 selects the memory device having the memory device ID showing a suffix that makes the share number smallest as assignment location when the arrangement elements of the arrangement A are viewed by fixing the memory device IDs of the memory devices to which the chunk-data are assigned as a component of the suffixes. When a plurality of different chunks are already assigned to memory devices, the arrangement elements are viewed as sum of a plurality of arrangements A by fixing the memory device IDs as component of the suffixes. For example, when determining the assignment location of chunk-data same as the chunk-data already assigned to memory devices 2-a and 2-c, the memory device 2-i whose i minimizes the arrangement A [a] [i]+ arrangement A [c] [i] is determined as assignment location.

For a chunk assigning process, the memory device that satisfies the above requirement of i is selected from the memory devices on the assignment candidate list in Step S1203 of FIG. 22 or Step S1304 in FIG. 23. Then, the requirement of i is satisfied by a plurality of memory devices, the assignment location may be determined typically by means of a random number.

Now, the method of determining the memory device from which chunk-data is to be read, or the read source memory device, that the chunk management section 3 uses will be described below. The read source memory device determining method is employed for the operation of determining the copy originating memory device in Step S1002 of the degree of redundancy raising process shown in FIG. 21. Assume that the chunk management section 3 keeps the number of chunk copying processes of each memory device in the form of a table. In the instance illustrated in FIG. 21, the number of copying processes of the copy originating memory device is made equal to +1 in Step S1003 and the number of copying processes of the memory device is made equal to −1 when the operation of Step S1004 is completed.

When the chunk management section 3 determines the read source, the section 3 selects the memory device whose number of copies is smallest as copy originating memory device among the memory devices to which the chunk-data to be added is assigned by referring to the above-described table. When the number of copies of the memory device that is the candidate of selection is larger than the number defined by the system, the chunk management section 3 may stand by for the copying process until the number of copies becomes less than the defined number. With this arrangement, the band that can be used for copying can be limited to secure a band that the memory device can use for other accesses during the copying process. Then, the security of access is guaranteed.

While the number of copies is controlled for the copy originating memory device in the above instance, the number of copies may be controlled for the copy destination memory devices so that, when the number of copies of any of the copy destination memory devices exceeds the number defined by the system, the chunk management section 3 stands by for the copying process. With this arrangement, the processing potential of each of the copy destination memory devices that can be exploited for other processes is secured. Then, the access performance of the memory devices is stabilized.

When a new memory device is added as substitute for a memory device that is disabled by a failure, assignment location may be limited to the newly added substitute memory device. While chunk-data is being copied to the substitute memory device, the substitute memory device may be excluded from objects of access, the copying process excepted, so that the substitute memory device may not be accessed for a read, for instance, and a process of copying chunk-data to the substrate memory device from another memory device may be executed concurrently. With this arrangement, all the band width of the substitute memory device can be used for one or more processes of copying chunk-data to the substitute memory device to reduce the time required for the copying process or processes. In other words, the time period in which the degree of redundancy is reduced is shortened to improve the availability of the memory device. When the substitute memory device can return to normal operations early, the access performance to the memory devices whose load is raised because they operate as replacements of the disabled memory device and receive accesses to chunk-data of the latter memory device is stabilized.

Now, the method of determining the object memory device for deletion to be used in the chunk management section 3 will be described. The method of determining the object memory device for deletion is employed for the operation of determining the copy chunk to be deleted in Step S901 of the number of copy chunks reducing process shown in FIG. 20.

The chunk management section 3 may select a memory device by means of a random number from the memory devices to which copy chunk-data of the object chunk-data are assigned by referring to the copying management information of the object chunk-data. Alternatively, the chunk management section 3 may hold the number of chunk-data that each of the memory devices stores and the unused data region of each of the memory devices in the form of a table and selects the memory device storing the largest number of chunk-data or the memory device whose unused data region is smallest as object of deletion. Still alternatively, when the load of each of the memory devices is known, the chunk management section 3 may select the memory device having the highest load as object of deletion.

Now, a method of determining the number of copies of chunk-data that the number of copies planning section 6 can use will be described. The number of copies may be determined from the availability point of view, considering availability and security, or from the accessibility point of view, considering throughput and response time. The larger one of the numbers determined from the two points of view will be selected as the number of copies here.

The number of copies is determined from the availability point of view to guarantee that any of chunk-data stored in a memory device that falls into a failure can be accessed at some other memory device.

Additionally, when executing a process of preparing copies after a failure takes place to maintain the necessary number of copies, the number of copies is determined by considering the probability with which the other memory device falls into a failure by the time when the process of preparing copies is completed. Thus, the longer the time until the completion of the copying process, the larger the number of copies determined from the availability point of view. In other words, the number of copies is a value determined on the basis of the capacity of memory device, the band available for copying and the reliability of memory device. The number of copies determined from the availability point of view is not smaller than 3 so that the degree of redundancy does not fall to 0 if one of the memory devices becomes disabled.

The number of copies is determined from the accessibility on the basis of the predicted demand for content-data, the processing capacity of each memory device and the safety coefficient defined by the system. For example, the number of copies may be determined by dividing the required throughput of content-data by the throughput of each memory device and multiplying the quotient of division by the safety coefficient defined by the system. The safety coefficient as used herein takes the situation where the demand is unexpectedly increased and the occupancy ratio of content-data in the memory device that a plurality of sets of content-data shares into consideration. A value that is not larger than 1 will be selected for the safety coefficient. The required throughput of content-data may be determined as the product of multiplication of the encoding bit rate of content-data and the number of demanding users. The average throughput or the smallest throughput of memory devices may be used. Alternatively, the sum of the throughputs of the memory devices selected as assignment locations may be determined and copies may be added if the sum is short of the required throughput.

A technique of producing a large number of copies of the leading chunk-data of content-data or of the chapters of content-data if content-data has chapters may be used. A buffer is used to ensure the stability of access when accessing media content-data or video content-data. However, the access cannot be stabilized at the top of content-data or immediately after the start of a chapter so that the stability of reproduction can be improved by increasing the number of copies of chunk-data that contains data located at the top of content-data or immediately after the start of a chapter.

Now, relocation of copy chunk-data will be described below. Copy chunk-data may be relocated when an instruction is given by the user, when one or more memory devices are added or removed, when the operating ratio or the busy ratio of the memory capacity of a memory device exceeds a threshold value (e.g., 80% or 90%) and/or when the difference between the operating ratio (or the busy ratio) of a memory device and the average operating ratio (or the average busy ratio) of the entire system exceeds a threshold value.

When a memory device is added, at first the chunk management section 3 randomly extracts chunk-data (copy chunk-data) assigned to a memory device other than the added memory device as assignment location in the copying management information of each chunk-data stored in the chunk management DB 7. Then, it determines if the added memory device can store the extracted chunk or not. The added memory device cannot store the extracted chunk-data typically when the memory device already stores chunk-data same as the extracted chunk-data found within the preceding or succeeding N chunk-data of the extracted chunk-data or when the extracted chunk-data makes the correlation with some other memory device high if it is stored in the added memory device.

When the extracted chunk-data can be stored in the added memory device, the chunk management section 3 moves the chunk-data to the new memory device as object chunk-data. If the extracted chunk-data cannot be stored in the added memory device, the chunk management section 3 extracts some other chunk-data once again. The chunk management section 3 moves chunk-data typically by causing the copying process section 5 to execute a copying process for the object chunk-data and subsequently alter the assignment location information of the object chunk-data showing the originating memory device so as to show the new memory device. Then, the chunk management section 3 makes the chunk management DB 7 reflect the alteration and causes the copying process section 5 to execute a process of deleting the object chunk-data from the originating memory device. Then, the chunk management section 3 causes the copying process section 5 to repeat the above process for number of times so as to make the added memory device store as many chunk-data as M, which is the number defined by the system. The number of chunk-data of M may be preset in the system or specified by the user at the time of the relocation. Alternatively, it may be determined on the basis of the capacity of the added memory device.

With the above-described arrangement, chunks are assigned immediately to the added memory device and the added memory device becomes available. Since the assignment location determining rule is applied to the added memory device, the added memory device does not give rise to any risk that the number of copies is reduced from the availability point of view and/or from the accessibility point of view and that the correlation among the memory devices is raised. With the above-described chunk moving method, the risk that the chunk-data being moved is accessed is low.

When a memory device is removed, an operation of relocation similar to the operation of relocation that is performed to maintain the number of copies when a memory device falls into a failure will take place.

An operation of relocation will also take place in other occasions. For example, the chunk management section 3 may randomly extract chunk-data to be moved from an arbitrarily selected memory device or a memory device where a high load is detected in terms of operating ratio or busy ratio. Then, the chunk management section 3 may randomly select a memory device as destination of the chunk-data to be moved from the memory devices other than the memory device from which the chunk is extracted and determines if the memory device selected as destination of the chunk-data to be moved can store the chunk-data or not.

When the memory device selected as destination of the extracted chunk-data to be moved can store the chunk-data, the chunk management section 3 moves the chunk-data to the selected memory device. When, on the other hand, the selected memory device cannot store the chunk-data, the chunk management section 3 selects a memory device as destination of the extracted chunk-data to be moved once again. When the memory device selected last time cannot store the chunk-data or none of the memory devices can store the chunk-data, the chunk management section 3 extracts another chunk-data to be moved. A method for moving the chunk-data to be used here is same as the method for moving chunk-data that is already described above.

With the above-described arrangement, the correlation among the memory devices can be reduced in the entire system. Additionally, the number of copies is not reduced from the availability point of view and/or from the accessibility point of view.

As described above in detail, this exemplary embodiment can show improved characteristics and performances in terms of distributed storage of data as content-data is divided into a plurality of chunk-data and the copy chunks prepared by copying the chunks are distributed among a plurality of memory devices and stored there according to a predetermined assignment location determining rule.

For example, as the chunk management section 3 determines the assignment locations of chunk-data such that same chunk-data are stored in respective memory devices that are different from each other, if a memory device falls into a failure and becomes disabled, the memory devices storing chunks same as the chunks stored in the failed memory device are accessible so that the availability of the memory devices of the system is consequently improved. Additionally, as the chunk management section 3 determines a plurality of chunk-data to be accessed, the host can read from a number of memory devices in a distributed manner so that the accessibility of the memory devices of the system is consequently improved.

Additionally, the chunk management section 3 determines the assignment locations of chunk-data such that chunks same as continuous chunk-data in content-data are stored in respective memory devices that are different from each other so that the accessibility of the memory devices of the system is consequently improved for sequential accesses.

Still additionally, when the chunk management section 3 determines the assignment locations of chunk-data so as to reduce the correlation among the memory devices of the system in addition to the above-described operations, the chunk-data stored in a memory device that is disabled by a failure can be accessed at some other memory device and hence the accessibility of the entire memory devices of the system is leveled. In other words, the fall of accessibility that takes place at the time of a failure can be reduced. Additionally, since all the memory devices of the system can operate as copy originating memory device and processes of preparing copies can be executed in parallel for the purpose of maintaining the number of copies after a failure takes place, the time necessary for the system to recover from the failure can be minimized. In other words, the degree of availability after occurrence of a failure can be reduced. Assignment locations of chunks can be determined so as to prevent copy chunk-data same as continuous chunk-data from sharing a memory device and reduce the correlation among memory devices.

Since the chunk management section 3 is responsible for managing assignment of chunks to the group of memory devices of the system, the logical data space formed by content-data and the physical data space formed by a group of memory devices can be mapped in a flexible manner so that the system can flexibly handle addition of a memory device.

The chunk management section 3 removes any memory device that falls into a failure and becomes disabled from objects of access to make the host no longer accessible to the failed memory device. In other words, the risk of access failure is reduced in case of trouble.

The number of copies planning section 6 alters the number of copies of chunk-data of content-data in response to a change in the access requests to content-data so as to make it possible to cope with the changing demand for content-data and minimize waste of memory capacity. In other words, accessibility can be made to match the changing demand for content-data and the capacity efficiency can be improved at the same time. As the number of copies planning section 6 determines the number of copies according to the position of the original chunk in content-data, the system can accommodate the demand that varies as a function of the position in content-data. In other words, the system provides accessibility that matches the changing demand for content-data and improves the capacity efficiency at the same time.

Streaming delivery servers are typical applications of the present invention. The present invention is advantageously applicable to distributed data storage systems having a large number of memory devices to be controlled such as streaming delivery server for providing a large quantity of content-data to a large number of unspecified users.

In the exemplary embodiment, the split data management section 3 determines and manages assignment locations of a plurality of copy data that correspond to each split data forming content-data. The split data management section 3 also deletes, adds and relocates copy data at a predetermined timing. It also determines the access location of split data forming content-data in response to a request for accessing content-data from the host 1. Number of copies planning section 6 determines the number of copies of each split data. With the assignment location determining method, it lists up all the available memory devices as assignment location candidates and determines assignment locations so as to make the memory devices storing a plurality of copy data corresponding to a same split data uniformly store copy data. It may determine assignment locations so as to make copy data corresponding to continuous split data in content-data to be stored in respective memory devices that are different from each other. Additionally, it may determine assignment locations so as to uniformize the share numbers of memory devices.

Second Exemplary Embodiment

According to the second exemplary embodiment of the invention, there is provided a distributed data storage system for splitting content-data into a plurality of split data and storing a plurality of copy data corresponding to at least one of the plurality of split data in a plurality of memory devices. The system comprise: copying management information storing unit configured to store copying management information indicating a storage location of the copy data corresponding to the split data (e.g., split data management DB 7); and access location determining unit configured to determine at least one of the plurality of memory devices storing the copy data corresponding to the split data as an access location for accessing split data (e.g., the access location determining function of the split data management section 3 or the host 1).

In the exemplary embodiment, the access location determining unit may determine, for a host terminal reading at least part of content-data, at least one of the plurality of memory devices storing the copy data corresponding to the split data forming the at least part of content-data as an access location for accessing split data, and notify it of the host terminal. For example, the access location determining unit may be the access location determining function of the split data management section 3.

In the exemplary embodiment, the access location determining unit may determine, at a host terminal reading at least part of content-data, at least one of the plurality of memory devices storing the copy data corresponding to the split data forming the at least part of content-data as an access location for accessing split data. For example, the access location determining unit may be the access location determining function of the host 1.

In the exemplary embodiment, the access location determining unit may randomly determine at least one of the plurality of memory devices storing the plurality of copy data corresponding to the split data based on a random number.

In the exemplary embodiment, the access location determining unit may determine a memory device having the lowest load in a plurality of memory devices storing a plurality of copy data corresponding to at least one of the plurality of split data as an access location.

In the exemplary embodiment, the distributed data storage system may further comprise: split data management unit configured to divide content-data into a plurality of split data and to determine a plurality of memory devices as storage locations of a plurality of copy data corresponding at least one of the plurality of split data. In the system, the copying management information storage unit may store copying management information indicating the storage locations of the plurality of copy data determined by the split data management unit.

In the exemplary embodiment, the split data management unit may determine storage locations of copy data so as to make memory devices uniformly store the plurality of copy data corresponding to the split data.

In the exemplary embodiment, the split data management unit may determine assignment locations of copy data so as to make memory devices store a plurality of copy data corresponding to a predetermined number of split data that are continuous in content-data in a distributed manner.

In the exemplary embodiment, the split data management unit may determine assignment locations of copy data so as to uniformize the share numbers of combinations of memory devices, the share number being the number of copy data corresponding to same split data shared by two memory devices.

In the exemplary embodiment, when determining an assignment location of copy data while the assignment location of copy data corresponding to the same split data is already determined, the split data management unit may determine the memory device showing the smallest share number when combined with the memory device already determined as assignment location of the copy data out of the memory devices except the memory device already determined as assignment location.

In the exemplary embodiment, when a memory device is disabled, the split data management unit may delete information indicating a disabled memory device as storage location from the copying management information storage unit.

In the exemplary embodiment, the distributed data storage system may further comprise: copying process configured to execute a copying process of copying data from a memory device to a memory device and a deletion process of deleting copy data from a memory device according to an instruction from the split data management unit. In the system, the split data management unit may determine a new assignment location for the copy data assigned to a disabled memory device as assignment location, determine a memory device as copy originating memory device out of the memory devices storing copy data corresponding to the split data same as the former copy data, and cause the copying process unit to execute the copying process of copying the copy data from the originating memory device.

In the exemplary embodiment, the distributed data storage system may further comprise: copying process unit configured to execute a copying process of copying data from a memory device to a memory device and a deletion process of deleting copy data from a memory device according to an instruction from the split data management unit. In the system, the split data management unit may determine a new assignment location for copy data at a predetermined timing according to the copying management information and cause the copying process unit to execute the copying process of copying data to the new assignment location and the deletion process of deleting copy data from the former assignment location.

In the exemplary embodiment, the distributed data storage system may further comprise: number of copies planning unit configured to determine the number of copies that is the number of copy data to be stored in memory devices for split data forming content-data. In the system, the split data management unit may determine the assignment locations of copy data corresponding to the split data according to the number of copies of the split data as determined by the number of copies planning unit.

In the exemplary embodiment, the number of copies planning unit may determine the number of copies of each split data according to the position of the split data in content-data.

In the exemplary embodiment, when the split data including data at the leading position of content-data is given and content-data are provided with chapters, the number of copies planning unit may make the number of copies of split data including data at the leading position of each chapter larger than the number of copies of any other split data of content-data.

In the exemplary embodiment, the number of copies planning unit may determine the number of copies of split data according to the access requests of content-data.

In the exemplary embodiment, the number of copies planning unit may determine the number of copies of split data according to the predicted access requests or the access requests of content-data, the processing capacity of each memory device and the safety coefficient defined by the system.

In the exemplary embodiment, the distributed data storage system may further comprise: copying process unit configured to execute a copying process of copying data from a memory device to a memory device and a deletion process of deleting copy data from a memory device according to an instruction from the split data management unit. In the system, the split data management unit may determine a new assignment location of copy data corresponding to split data or an assignment location for deleting copy data corresponding to the split data so as to make the number of copies of the split data as determined by the number of copies planning unit and the number of copy data corresponding to the split data and stored in memory devices agree with each other and cause the copying process unit to execute the copying process of copying the copy data or deletion process of deleting the copy data.

Third Exemplary Embodiment

According to the third exemplary embodiment of the invention, there is provided a split data management apparatus used for a distributed data storage system for splitting content-data into a plurality of split data and storing a plurality of copy data corresponding at least one of the plurality of split data in a plurality of memory devices. The apparatus is adapted to notify a host terminal reading at least part of content-data of the access location for accessing split data forming content-data. The apparatus comprises: access location determining unit configured to determine at least one of the plurality of memory devices as an access location for accessing the split data out of the memory devices storing copy data corresponding to the split data according to the copying management information indicating the assignment locations of copy data corresponding to the split data included in content-data read range of the host terminal.

Fourth Exemplary Embodiment

According to the fourth exemplary embodiment of the invention, there is provided a host terminal used for a distributed data storage system for splitting content-data into a plurality of split data and storing a plurality of copy data corresponding to at least one of the plurality of split data in a plurality of memory devices. The host terminal is adapted to access the plurality of memory devices storing split data forming content-data in order to read at least part of content-data. The host terminal comprises: access location determining unit configured to determine at least one of the plurality of memory devices as an access location for accessing the split data out of the memory devices storing copy data corresponding to the split data according to the copying management information indicating the assignment locations of copy data corresponding to the split data included in content-data read range thereof.

Fifth Exemplary Embodiment

According to the fifth exemplary embodiment of the invention, there is provided a data distribution method for a distributed data storage system for splitting content-data into a plurality of split data and storing a plurality of copy data corresponding to at least one of the plurality of split data in a plurality of memory devices. The method comprising: a step in which copying management information storing unit stores copying management information indicating the storage locations of copy data corresponding to split data; and a step in which access location determining unit determines at least one of the plurality of memory devices storing the copy data corresponding to split data as location for accessing the split data according to the copying management information.

In the exemplary embodiment, the method may further comprise: a step of in which the access location determining unit determines, for a host terminal reading at least part of content-data, at least one of the plurality of memory devices storing the copy data corresponding to the split data forming the at least part of content-data as an access location for accessing split data, and notifies it of the host terminal.

In the exemplary embodiment, the method may further comprise: a step in which the access location determining unit determines, at a host terminal reading at least part of content-data, at least one of the plurality of memory devices storing the copy data corresponding to the split data forming the at least part of content-data as an access location for accessing split data.

In the exemplary embodiment, the method may further comprise: a step in which the access location determining unit randomly determines at least one of the plurality of memory devices storing the plurality of copy data corresponding to the split data based on a random number.

In the exemplary embodiment, the method may further comprise: a step in which the access location determining unit determines a memory device having the lowest load in a plurality of memory devices storing a plurality of copy data corresponding to at least one of the plurality of split data as an access location.

In the exemplary embodiment, the method may further comprise: a step in which split data management unit divides content-data into a plurality of split data and determines a plurality of memory devices as storage locations of a plurality of copy data corresponding at least one of the plurality of split data; and a step in which the copying management information storage unit stores copying management information indicating the storage locations of the plurality of copy data determined by the split data management unit.

In the exemplary embodiment, the method may further comprise: a step in which the split data management unit determines storage locations of copy data so as to make memory devices uniformly store the plurality of copy data corresponding to the split data.

In the exemplary embodiment, the method may further comprise: a step in which the split data management unit determines assignment locations of copy data so as to make memory devices store a plurality of copy data corresponding to a predetermined number of split data that are continuous in content-data in a distributed manner.

In the exemplary embodiment, the method may further comprise: a step in which the split data management unit determines assignment locations of copy data so as to uniformize the share numbers of combinations of memory devices, the share number being the number of copy data corresponding to same split data shared by two memory devices.

In the exemplary embodiment, the method may further comprise: a step in which, when determining an assignment location of copy data while the assignment location of copy data corresponding to the same split data is already determined, the split data management unit determines the memory device showing the smallest share number when combined with the memory device already determined as assignment location of the copy data out of the memory devices except the memory device already determined as assignment location.

In the exemplary embodiment, the method may further comprise: a step in which, when a memory device is disabled, the split data management unit deletes information indicating a disabled memory device as storage location from the copying management information storage unit.

In the exemplary embodiment, the method may further comprise: a step in which copying process unit executes a copying process of copying data from a memory device to a memory device and a deletion process of deleting copy data from a memory device according to an instruction from the split data management unit; and a step in which the split data management unit determines a new assignment location for the copy data assigned to a disabled memory device as assignment location, determines a memory device as copy originating memory device out of the memory devices storing copy data corresponding to the split data same as the former copy data, and causes the copying process unit to execute the copying process of copying the copy data from the originating memory device.

In the exemplary embodiment, the method may further comprise: a step in which copying process unit executes a copying process of copying data from a memory device to a memory device and a deletion process of deleting copy data from a memory device according to an instruction from the split data management unit; and a step in which the split data management unit determines a new assignment location for copy data at a predetermined timing according to the copying management information and causes the copying process unit to execute the copying process of copying data to the new assignment location and the deletion process of deleting copy data from the former assignment location.

In the exemplary embodiment, the method may further comprise: a step in which number of copies planning unit determines the number of copies that is the number of copy data to be stored in memory devices for split data forming content-data; and a step in which the split data management unit determines the assignment locations of copy data corresponding to the split data according to the number of copies of the split data as determined by the number of copies planning unit.

In the exemplary embodiment, the method may further comprise: a step in which the number of copies planning unit determines the number of copies of each split data according to the position of the split data in content-data.

In the exemplary embodiment, the method may further comprise: a step in which, when the split data including data at the leading position of content-data is given and content-data are provided with chapters, the number of copies planning unit makes the number of copies of split data including data at the leading position of each chapter larger than the number of copies of any other split data of content-data.

In the exemplary embodiment, the method may further comprise: a step in which the number of copies planning unit determines the number of copies of split data according to the access requests of content-data.

In the exemplary embodiment, the method may further comprise: a step in which the number of copies planning unit determines the number of copies of split data according to the predicted access requests or the access requests of content-data, the processing capacity of each memory device and the safety coefficient defined by the system.

In the exemplary embodiment, the method may further comprise: a step in which copying process unit executes a copying process of copying data from a memory device to a memory device and a deletion process of deleting copy data from a memory device according to an instruction from the split data management unit; and a step in which the split data management unit determines a new assignment location of copy data corresponding to split data or an assignment location for deleting copy data corresponding to the split data so as to make the number of copies of the split data as determined by the number of copies planning unit and the number of copy data corresponding to the split data and stored in memory devices agree with each other and causes the copying process unit to execute the copying process of copying the copy data or deletion process of deleting the copy data.

Fourth Exemplary Embodiment

According to the fourth exemplary embodiment of the invention, there is provided a computer program, encoded in a computer-readable medium, for a split data management apparatus in a distributed data storage system for splitting content-data into a plurality of split data and storing a plurality of copy data corresponding to at least split data in a plurality of memory devices. The apparatus notifies an access location for accessing split data of content-data to a host terminal reading at least part of content-data. The program causes a computer to execute a process of: determining at least one of the plurality of memory devices storing the copy data corresponding to the split data as an access location for accessing split data according to the copying management information indicating the location of the copy data corresponding to the split data included in content-data reading range of the host terminal.

In the exemplary embodiment, the computer program may further cause the computer to execute a process of: dividing content-data into a plurality of split data and determining a plurality of memory devices as storage locations of a plurality of copy data corresponding at least one of the plurality of split data.

Sixth Exemplary Embodiment

According to the sixth exemplary embodiment of the invention, there is a computer program, encoded in a computer-readable medium, for a host terminal in a distributed data storage system for splitting content-data into a plurality of split data and storing a plurality of copy data corresponding to at least one of the plurality of split data in a plurality of memory devices. The host terminal is configured to access the plurality of memory devices storing split data forming content-data in order to read at least part of content-data. The program causes a computer to execute a process of: determining at least one of the plurality of memory devices as an access location for accessing the split data out of the memory devices storing copy data corresponding to the split data according to copying management information indicating an assignment location of copy data corresponding to the split data included in content-data read range thereof.

Thus, the above exemplary embodiments of the invention can improve the characteristics and the performances of data distribution. The reason for this is that a copying management information storing unit stores the assignment locations of split data stored in a plurality of memory devices as copying management information and an access location determining unit selects at least one memory device as access location out of a plurality of memory devices without discriminating memory devices to be used ordinary operations and memory devices to be used in failures.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A distributed data storage system for splitting content-data into a plurality of split data and storing a plurality of copy data corresponding to at least one of the plurality of split data in a plurality of memory devices, the system comprising:
    a copy number planner configured to determine a number of copies for each of the split data based on a system situation including at least one of a demand for the content-data, a predicted demand for the content-data, and an available number of the split data;
    a copying management information storing unit for storing copying management information indicating a storage location of the copy data corresponding to the split data;
    an access location determining unit for determining at least one of the plurality of memory devices storing the copy data corresponding to the split data as an access location for accessing split data; and
    a split data manager for dividing content-data into a plurality of split data and determining a plurality of memory devices as storage locations of a plurality of copy data corresponding to at least one of the plurality of split data,
    wherein the access location is determined so that the copy data and the corresponding split data are stored in different memory devices, and so as to reduce correlation between the memory devices;
    the copying management information storage unit stores copying management information indicating the storage locations of the plurality of copy data determined by the split data manager;
    the split data manager determines assignment locations of copy data so as to uniformize the share numbers of combinations of memory devices, the share number being the number of copy data corresponding to same split data shared by two memory devices;
    when determining an assignment location of copy data while the assignment location of copy data corresponding to the same split data is already determined, the split data manager determines the memory device showing the smallest share number when combined with the memory device already determined as assignment location of the copy data out of the memory devices except the memory device already determined as assignment location; and
    the split data manager determines the assignment locations of copy data using a table that shows a two-dimensional arrangement n×n memory devices.

2. The distributed data storage system according to claim 1, wherein:
    the access location determining unit determines, for a host terminal reading at least part of content-data, at least one of the plurality of memory devices storing the copy data corresponding to the split data forming the at least part of content-data as an access location for accessing split data, and notifies it of the host terminal.

3. The distributed data storage system according to claim 1, wherein:
    the access location determining unit determines, at a host terminal reading at least part of content-data, at least one of the plurality of memory devices storing the copy data corresponding to the split data forming the at least part of content-data as an access location for accessing split data.

4. The distributed data storage system according to claim 1, wherein:
    the access location determining unit randomly determines at least one of the plurality of memory devices storing the plurality of copy data corresponding to the split data based on a random number.

5. The distributed data storage system according to claim 1, wherein:
    the access location determining unit determines a memory device having the lowest load in a plurality of memory devices storing a plurality of copy data corresponding to at least one of the plurality of split data as an access location.

6. The distributed data storage system according to claim 1, wherein:
    the split data manager determines storage locations of copy data so as to make memory devices uniformly store the plurality of copy data corresponding to the split data.

7. The distributed data storage system according to claim 1, wherein:
    the split data manager determines assignment locations of copy data so as to make memory devices store a plurality of copy data corresponding to a predetermined number of split data that are continuous in content-data in a distributed manner.

8. The distributed data storage system according to claim 1, wherein:
    when a memory device is disabled, the split data manager deletes information indicating a disabled memory device as storage location from the copying management information storage unit.

9. The distributed data storage system according to claim 1, further comprising:
    a copying processor for executing a copying process of copying data from a memory device to a memory device and a deletion process of deleting copy data from a memory device according to an instruction from the split data manager, wherein:
    the split data manager determines a new assignment location for the copy data assigned to a disabled memory device as assignment location, determines a memory device as copy originating memory device out of the memory devices storing copy data corresponding to the split data same as the former copy data, and causes the copying processor to execute the copying process of copying the copy data from the originating memory device.

10. The distributed data storage system according to claim 1, further comprising:
    a copying processor for executing a copying process of copying data from a memory device to a memory device and a deletion process of deleting copy data from a memory device according to an instruction from the split data manager, wherein:

the split data manager determines a new assignment location for copy data at a predetermined timing according to the copying management information and causes the copying processor to execute the copying process of copying data to the new assignment location and the deletion process of deleting copy data from the former assignment location.

11. The distributed data storage system according to claim 1, further comprising:

a copy number planner for determining the number of copies that is the number of copy data to be stored in memory devices for split data forming content-data, wherein:

the split data manager determines the assignment locations of copy data corresponding to the split data according to the number of copies of the split data as determined by the copy number planner.

12. The distributed data storage system according to claim 11, wherein:

the copy number planner determines the number of copies of each split data according to the position of the split data in content-data.

13. The distributed data storage system according to claim 12, wherein:

when the split data including data at the leading position of content-data is given and content-data are provided with chapters, the copy number planner makes the number of copies of split data including data at the leading position of each chapter larger than the number of copies of any other split data of content-data.

14. The distributed data storage system according to claim 11, wherein:

the copy number planner determines the number of copies of split data according to the access requests of content-data.

15. The distributed data storage system according to claim 14, wherein:

the copy number planner determines the number of copies of split data according to: (a) the predicted access requests or the access requests of content-data, (b) the processing capacity of each memory device and (c) the safety coefficient defined by the system.

16. The distributed data storage system according to claim 11, further comprising:

a copying processor for executing a copying process of copying data from a memory device to a memory device and a deletion process of deleting copy data from a memory device according to an instruction from the split data manager, wherein:

the split data manager determines a new assignment location of copy data corresponding to split data or an assignment location for deleting copy data corresponding to the split data so as to make the number of copies of the split data as determined by the copy number planner and the number of copy data corresponding to the split data and stored in memory devices agree with each other and causes the copying processor to execute the copying process of copying the copy data or deletion process of deleting the copy data.

17. A split data management apparatus used for a distributed data storage system for splitting content-data into a plurality of split data and storing a plurality of copy data corresponding to at least one of the plurality of split data in a plurality of memory devices, the apparatus being adapted to notify a host terminal reading at least part of content-data of the access location for accessing split data forming content-data, the apparatus comprising:

a copy number planner configured to determine a number of copies for each of the split data based on a system situation including at least one of a demand for the content-data, a predicted demand for the content-data, and an available number of the split data;

an access location determining unit for determining at least one memory device as an access location for accessing the split data out of the memory devices storing copy data corresponding to the split data according to copying management information indicating the assignment locations of copy data corresponding to the split data included in content-data read range of the host terminal; and a split data manager for dividing content-data into a plurality of split data and determining a plurality of memory devices as storage locations of a plurality of copy data corresponding to at least one of the plurality of split data, wherein the access location is determined so that the copy data and the corresponding split data are stored in different memory devices, and so as to reduce correlation between the memory devices;

the copying management information storage unit stores copying management information indicating the storage locations of the plurality of copy data determined by the split data manager;

the split data manager determines assignment locations of copy data so as to uniformize the share numbers of combinations of memory devices, the share number being the number of copy data corresponding to same split data shared by two memory devices;

when determining an assignment location of copy data while the assignment location of copy data corresponding to the same split data is already determined, the split data manager determines the memory device showing the smallest share number when combined with the memory device already determined as assignment location of the copy data out of the memory devices except the memory device already determined as assignment location; and the split data manager determines the assignment locations of copy data using a table that shows a two-dimensional arrangement n×n memory devices.

18. A host terminal used for a distributed data storage system for splitting content-data into a plurality of split data and storing a plurality of copy data corresponding to at least one of the plurality of split data in a plurality of memory devices, the host terminal being adapted to access the plurality of memory devices storing split data forming content-data in order to read at least part of content-data, the host terminal comprising:

a copy number planner configured to determine a number of copies for each of the split data based on a system situation including at least one of a demand for the content-data, a predicted demand for the content-data, and an available number of the split data;

an access location determining unit for determining at least one of the plurality of memory devices as an access location for accessing the split data out of the memory devices storing copy data corresponding to the split data according to copying management information indicating the assignment locations of copy data corresponding to the split data included in content-data read range thereof; and a split data manager for dividing content-data into a plurality of split data and determining a plurality of memory devices as storage locations of a plurality of copy data corresponding to at least one of the plurality of split data, wherein the access location is determined so that the copy data and the corresponding split data are stored in different memory devices, and so as to reduce correlation between the memory devices;

the copying management information storage unit stores copying management information indicating the storage locations of the plurality of copy data determined by the split data manager;

the split data manager determines assignment locations of copy data so as to uniformize the share numbers of combinations of memory devices, the share number being the number of copy data corresponding to same split data shared by two memory devices;

when determining an assignment location of copy data while the assignment location of copy data corresponding to the same split data is already determined, the split data manager determines the memory device showing the smallest share number when combined with the memory device already determined as assignment location of the copy data out of the memory devices except the memory device already determined as assignment location; and the split data manager determines the assignment locations of copy data using a table that shows a two-dimensional arrangement n×n memory devices.

19. A data distribution method for a distributed data storage system for splitting content-data into a plurality of split data and storing a plurality of copy data corresponding to at least one of the plurality of split data in a plurality of memory devices, the method comprising:

a step in which a copy number planner determines a number of copies for each of the split data based on a system situation including at least one of a demand for the content-data, a predicted demand for the content-data, and an available number of the split data;

a step in which a copying management information storing unit stores copying management information indicating the storage locations of copy data corresponding to split data;

a step in which an access location determining unit determines at least one of the plurality of memory devices storing the copy data corresponding to split data as a location for accessing the split data according to the copying management information;

a step in which a split data manager divides content-data into a plurality of split data and determines a plurality of memory devices as storage locations of a plurality of copy data corresponding to at least one of the plurality of split data; and a step in which the copying management information storage unit stores copying management information indicating the storage locations of the plurality of copy data determined by the split data manager;

a step in which the split data manager determines assignment locations of copy data so as to uniformize the share numbers of combinations of memory devices, the share number being the number of copy data corresponding to same split data shared by two memory devices;

a step in which, when determining an assignment location of copy data while the assignment location of copy data corresponding to the same split data is already determined, the split data manager determines the memory device showing the smallest share number when combined with the memory device already determined as assignment location of the copy data out of the memory devices except the memory device already determined as assignment location, wherein the access location is determined so that the copy data and the corresponding split data are stored in different memory devices, and so as to reduce correlation between the memory devices; and a step in which the split data manager determines the assignment locations of copy data using a table that shows a two-dimensional arrangement n×n memory devices.

20. The data distribution method according to claim 19, further comprising:

a step of in which the access location determining unit determines, for a host terminal reading at least part of content-data, at least one of the plurality of memory devices storing the copy data corresponding to the split data forming the at least part of content-data as an access location for accessing split data, and notifies it of the host terminal.

21. The data distribution method according to claim 19, further comprising:

a step in which the access location determining unit determines, at a host terminal reading at least part of content-data, at least one of the plurality of memory devices storing the copy data corresponding to the split data forming the at least part of content-data as an access location for accessing split data.

22. The data distribution method according to claim 19, further comprising:

a step in which the access location determining unit randomly determines at least one of the plurality of memory devices storing the plurality of copy data corresponding to the split data based on a random number.

23. The data distribution method according to claim 19, further comprising:

a step in which the access location determining unit determines a memory device having the lowest load in a plurality of memory devices storing a plurality of copy data corresponding to at least one of the plurality of split data as an access location.

24. The data distribution method according to claim 19, further comprising:

a step in which the split data manager determines storage locations of copy data so as to make memory devices uniformly store the plurality of copy data corresponding to the split data.

25. The data distribution method according to claim 19, further comprising:

a step in which the split data manager determines assignment locations of copy data so as to make memory devices store a plurality of copy data corresponding to a predetermined number of split data that are continuous in content-data in a distributed manner.

26. The data distribution method according to claim 19, further comprising:

a step in which, when a memory device is disabled, the split data manager deletes information indicating a disabled memory device as storage location from the copying management information storage unit.

27. The data distribution method according to claim 19, further comprising:

a step in which a copying processor executes a copying process of copying data from a memory device to a memory device and a deletion process of deleting copy data from a memory device according to an instruction from the split data manager; and a step in which the split data manager determines a new assignment location for the copy data assigned to a disabled memory device as assignment location, determines a memory device as copy originating memory device out of the memory devices storing copy data corresponding to the split data same as the former copy data, and causes the copying processor to execute the copying process of copying the copy data from the originating memory device.

28. The data distribution method according to claim 19, further comprising:

a step in which a copying processor executes a copying process of copying data from a memory device to a memory device and a deletion process of deleting copy data from a memory device according to an instruction from the split data manager; and a step in which the split data manager determines a new assignment location for copy data at a predetermined timing according to the copying management information and causes the copying processor to execute the copying process of copying data to the new assignment location and the deletion process of deleting copy data from the former assignment location.

29. The data distribution method according to claim 19, further comprising:

a step in which a copy number planner determines the number of copies that is the number of copy data to be stored in memory devices for split data forming content-data; and a step in which the split data manager determines the assignment locations of copy data corresponding to the split data according to the number of copies of the split data as determined by the copy number planner.

30. The data distribution method according to claim 29, further comprising:

a step in which the copy number planner determines the number of copies of each split data according to the position of the split data in content-data.

31. The data distribution method according to claim 30, further comprising:

a step in which, when the split data including data at the leading position of content-data is given and content-data are provided with chapters, the copy number planner makes the number of copies of split data including data at the leading position of each chapter larger than the number of copies of any other split data of content-data.

32. The data distribution method according to claim 29, further comprising:

a step in which the copy number planner determines the number of copies of split data according to the access requests of content-data.

33. The data distribution method according to claim 32, further comprising:

a step in which the copy number planner determines the number of copies of split data according to: (a) the predicted access requests or the access requests of content-data, (b) the processing capacity of each memory device and (c) the safety coefficient defined by the system.

34. The data distribution method according to claim 29, further comprising:

a step in which a copying processor executes a copying process of copying data from a memory device to a memory device and a deletion process of deleting copy data from a memory device according to an instruction from the split data manager; and a step in which the split data manager determines a new assignment location of copy data corresponding to split data or an assignment location for deleting copy data corresponding to the split data so as to make the number of copies of the split data as determined by the copy number planner and the number of copy data corresponding to the split data and stored in memory devices agree with each other and causes the copying processor to execute the copying process of copying the copy data or deletion process of deleting the copy data.

35. A computer program, encoded in a non-transitory computer-readable medium, for a split data management apparatus in a distributed data storage system for splitting content-data into a plurality of split data and storing a plurality of copy data corresponding to at least split data in a plurality of memory devices, the apparatus notifying an access location for accessing split data of content-data to a host terminal reading at least part of content-data, the program causing a computer to execute a process of:

determining a number of copies for each of the split data based on a system situation including at least one of a demand for the content-data, a predicted demand for the content-data, and an available number of the split data;

determining at least one of the plurality of memory devices storing the copy data corresponding to the split data as an access location for accessing split data according to copying management information indicating the location of the copy data corresponding to the split data included in content-data reading range of the host terminal;

dividing content-data into a plurality of split data and determining a plurality of memory devices as storage locations of a plurality of copy data corresponding to at least one of the plurality of split data;

storing copying management information indicating the storage locations of the plurality of copy data;

determining assignment locations of copy data so as to uniformize the share numbers of combinations of memory devices, the share number being the number of copy data corresponding to same split data shared by two memory devices;

when determining an assignment location of copy data while the assignment location of copy data corresponding to the same split data is already determined, determining the memory device showing the smallest share number when combined with the memory device already determined as assignment location of the copy data out of the memory devices except the memory device already determined as assignment location, wherein the access location is determined so that the copy data and the corresponding split data are stored in different memory devices, and so as to reduce correlation between the memory devices; and determining the assignment locations of copy data using a table that shows a two-dimensional arrangement n×n memory devices.

36. A computer program, encoded in a non-transitory computer-readable medium, for a host terminal in a distributed data storage system for splitting content-data into a plurality of split data and storing a plurality of copy data corresponding to at least one of the plurality of split data in a plurality of memory devices, the host terminal being configured to access the plurality of memory devices storing split data forming content-data in order to read at least part of content-data, the program causing a computer to execute a process of:

determining a number of copies for each of the split data based on a system situation including at least one of a demand for the content-data, a predicted demand for the content-data, and an available number of the split data;

determining at least one of the plurality of memory devices as an access location for accessing the split data out of the memory devices storing copy data corresponding to the split data according to copying management information indicating an assignment location of copy data corresponding to the split data included in content-data read range thereof and dividing content-data into a plurality of split data and determining a plurality of memory devices as storage locations of a plurality of copy data corresponding to at least one of the plurality of split data;

storing copying management information indicating the storage locations of the plurality of copy data;

determining assignment locations of copy data so as to uniformize the share numbers of combinations of memory devices, the share number being the number of copy data corresponding to same split data shared by two memory devices;

when determining an assignment location of copy data while the assignment location of copy data corresponding to the same split data is already determined, determining the memory device showing the smallest share number when combined with the memory device already determined as assignment location of the copy data out of the memory devices except the memory device already determined as assignment location, wherein the access location is determined so that the copy data and the corresponding split data are stored in different memory devices, and so as to reduce correlation between the memory devices; and determining the assignment locations of copy data using a table that shows a two-dimensional arrangement n×n memory devices.

* * * * *